(12) United States Patent
Thomas et al.

(10) Patent No.: US 11,875,459 B2
(45) Date of Patent: Jan. 16, 2024

(54) SUBJECT SPECIFIC COORDINATIZATION AND VIRTUAL NAVIGATION SYSTEMS AND METHODS

(71) Applicant: Vida Diagnostics, Inc., Coralville, IA (US)

(72) Inventors: Benj Thomas, Eden Prairie, MN (US); John D. Newell, Jr., Port Townsend, WA (US); Samuel Peterson, Topanga, CA (US)

(73) Assignee: VIDA Diagnostics, Inc., Coralville, IA (US)

( * ) Notice: Subject to any disclaimer, the term of this patent is extended or adjusted under 35 U.S.C. 154(b) by 303 days.

(21) Appl. No.: 17/223,393

(22) Filed: Apr. 6, 2021

(65) Prior Publication Data
US 2021/0312616 A1 Oct. 7, 2021

Related U.S. Application Data
(60) Provisional application No. 63/006,691, filed on Apr. 7, 2020.

(51) Int. Cl.
*G06T 7/62* (2017.01)
*G06F 18/2135* (2023.01)
(Continued)

(52) U.S. Cl.
CPC ........ *G06T 19/00* (2013.01); *G06F 18/21355* (2023.01); *G06T 7/0012* (2013.01); *G06T 7/62* (2017.01); *G06T 2207/30064* (2013.01)

(58) Field of Classification Search
CPC ......... G06T 19/00; G06T 7/0012; G06T 7/62; G06T 2207/30064; G06T 11/00; G06T 2210/41; G06T 2219/028; G06F 18/21355
See application file for complete search history.

(56) References Cited

U.S. PATENT DOCUMENTS

| 5,558,091 A | 9/1996 | Acker et al. |
| 6,380,732 B1 | 4/2002 | Gilboa |

(Continued)

FOREIGN PATENT DOCUMENTS

| CN | 1395713 A | 2/2003 |
| DE | 102005039657 A1 | 3/2007 |

(Continued)

OTHER PUBLICATIONS

Mistelbauer et al., "Smart super views A knowledge-assisted interface for medical visualization", 2012 IEEE Conference on Visual Analytics Science and Technology, Oct. 14, 2012, pp. 163-172.

(Continued)

*Primary Examiner* — Siamak Harandi
(74) *Attorney, Agent, or Firm* — Fredrikson & Byron, P.A.

(57) ABSTRACT

A method for analyzing an anatomical structure of a patient may include the steps of receiving volumetric scan data representative of one or more features of an anatomical structure; mapping the features to a node tree diagram; and displaying the node tree diagram. The features can comprise branching points, pathways connecting the branching points, and location data of the branching points and pathways. The node tree diagram may comprise a plurality of nodes and branches representing the branching points and pathways in the anatomical structure, respectively. The plurality of nodes may comprise a root node representing a root branching point as well as additional nodes representing additional branching points. Additionally, the node tree diagram may comprise a first set of one or more regions, wherein each region encompasses a respective portion of the node tree diagram and is representative of a defined portion of the anatomical structure.

22 Claims, 22 Drawing Sheets

(51) Int. Cl.
G06T 19/00 (2011.01)
G06T 7/00 (2017.01)

(56) References Cited

U.S. PATENT DOCUMENTS

| | | | |
|---|---|---|---|
| 6,456,868 | B2 | 9/2002 | Saito et al. |
| 6,466,687 | B1 | 10/2002 | Uppaluri et al. |
| 6,466,815 | B1 | 10/2002 | Saito et al. |
| 6,558,333 | B2 | 5/2003 | Gilboa et al. |
| 6,580,938 | B1 | 6/2003 | Acker |
| 6,615,155 | B2 | 9/2003 | Gilboa |
| 6,711,429 | B1 | 3/2004 | Gilboa et al. |
| 6,775,404 | B1 | 8/2004 | Pagoulatos et al. |
| 6,807,292 | B1 | 10/2004 | Goto et al. |
| 7,233,820 | B2 | 6/2007 | Gilboa |
| 7,274,810 | B2 | 9/2007 | Reeves et al. |
| 7,611,452 | B2 | 11/2009 | Allison et al. |
| 7,711,167 | B2 | 5/2010 | Kiraly et al. |
| 7,760,941 | B2 | 7/2010 | Bornemann et al. |
| 8,045,769 | B2 | 10/2011 | Wiemker et al. |
| 8,219,179 | B2 | 7/2012 | Ganatra et al. |
| 8,428,317 | B2 | 4/2013 | Kimia et al. |
| 8,611,989 | B2 | 12/2013 | Roberts |
| 8,700,132 | B2 | 4/2014 | Ganatra et al. |
| 9,076,201 | B1 | 7/2015 | Negahdar et al. |
| 11,176,666 | B2 | 11/2021 | Peterson et al. |
| 2003/0029464 | A1 | 2/2003 | Chen et al. |
| 2003/0051733 | A1 | 3/2003 | Kotmel et al. |
| 2003/0108853 | A1 | 6/2003 | Chosack et al. |
| 2005/0182295 | A1 | 8/2005 | Soper et al. |
| 2005/0228250 | A1 | 10/2005 | Bitter et al. |
| 2005/0251017 | A1 | 11/2005 | Azar |
| 2005/0272971 | A1 | 12/2005 | Ohnishi et al. |
| 2006/0030958 | A1 | 2/2006 | Tschirren et al. |
| 2007/0003124 | A1 | 1/2007 | Wood et al. |
| 2007/0053562 | A1 | 3/2007 | Reinhardt et al. |
| 2007/0078334 | A1 | 4/2007 | Scully et al. |
| 2007/0092864 | A1 | 4/2007 | Reinhardt et al. |
| 2007/0223794 | A1 | 9/2007 | Preiss et al. |
| 2007/0293721 | A1 | 12/2007 | Gilboa |
| 2008/0205722 | A1 | 8/2008 | Schaefer et al. |
| 2010/0305463 | A1 | 12/2010 | Macklem et al. |
| 2011/0071404 | A1 | 3/2011 | Schmitt et al. |
| 2012/0249465 | A1 | 10/2012 | Tschirren et al. |
| 2012/0284657 | A1 | 11/2012 | Hafey et al. |
| 2014/0105472 | A1 | 4/2014 | Yin et al. |
| 2014/0275952 | A1 | 9/2014 | Monroe et al. |
| 2015/0238270 | A1 | 8/2015 | Raffy et al. |
| 2015/0332454 | A1 | 11/2015 | Yin et al. |
| 2015/0351714 | A1 | 12/2015 | De Backer |
| 2017/0124771 | A1* | 5/2017 | Canfield ............ G06T 19/20 |
| 2017/0278301 | A1 | 9/2017 | Peterson et al. |
| 2019/0290225 | A1 | 9/2019 | Dunican et al. |
| 2021/0183054 | A1* | 6/2021 | Guo .................. G06T 7/174 |
| 2022/0172367 | A1 | 6/2022 | Thomas et al. |

FOREIGN PATENT DOCUMENTS

| | | |
|---|---|---|
| JP | H11318884 A | 11/1999 |
| JP | 2004113537 A | 4/2004 |
| JP | 2004283373 A | 10/2004 |
| JP | 2010541114 A | 12/2010 |
| JP | 2014210084 A | 11/2014 |
| WO | 03007198 A2 | 1/2003 |
| WO | 03086498 A2 | 10/2003 |
| WO | 2005007023 A2 | 1/2005 |
| WO | 2005119505 A2 | 12/2005 |
| WO | 2009103046 A2 | 8/2009 |

OTHER PUBLICATIONS

Yee et al., "Animated exploration of dynamic graphs with radial layout", INFOVIS 2001 IEEE Symposium on Information Visualization, Jan. 1, 2001, pp. 43-50.

Yu et al., "System for the analysis and visualization of large 3D anatomical trees", Computers in Biology and Medicine, vol. 37, No. 12, Oct. 17, 2007, pp. 1802-1820.

International Patent Application No. PCT/US2021/026066, Invitation to Pay Fees and Partial Search Report dated Jul. 19, 2021, 25 pages.

Austin, "Pulmonary emphysema: imaging assessment of lung volume reduction surgery," Radiology, vol. 212, No. 1, Jul. 1999, pp. 1-3.

Brown et al., "CAD in clinical trials: Current role and architectural requirements," Available online at www.sciencedirect.com, Apr. 20, 2007, 6 pages.

Cetti et al., "Collateral ventilation," Thorax Journal, vol. 61, 2006, pp. 371-373.

Herth et al., "Efficacy Predictors of Lung Volume Reduction with Zephyr Valves in a European Cohort," European Respiratory Journal, vol. 39, No. 6, Jan. 26, 2012, pp. 1334-1342.

Herth et al., "Radiological and clinical outcomes of using Chartis to plan endobronchial valve treatment," European Respiratory Journal, electronic publication May 3, 2012, retrieved from <http://erj.ersjournals.com/content/41/2/302> on Sep. 30, 2014.

Horn, Berthold K. P., "Closed-form solution of absolute orientation using unit quarternions", Journal of the Optical Society of America A, Apr. 1987, pp. 629-642, vol. 4.

InterVapor—How it Works, Uptake Medical, Retrieved online from <https://web.archive.org/web/20121124070645/http://www.uptakemedical.com/about-intervapor/how-it-works, dated Nov. 24, 2012, 3 pages.

Leotta, Daniel F., "An Efficient calibration Method for Freehand 3-D Ultrasound Imaging Systems", May 13, 2004, pp. 999-1008, vol. 30, No. 7, Ultrasound in Medicine & Biology, (doi:10.1016/j.ultrasmedbio.2004.5.007).

Li, Kang, "Efficient Optimal Net Surface Detection for Image Segmentation From Theory to Practice", Masters Thesis for University of Iowa, Dec. 2003.

Mishima et al., "Complexity of terminal airspace geometry assessed by lung computed tomography in normal subjects and patients with chronic obstructive pulmonary disease," Proceedings of the National Academy of Sciences, vol. 96, No. 16, Aug. 3, 1999, pp. 8829-8834. Abstract only.

Nimura et al., "A study on quantifying COPD severity by combining pulmonary function tests and CT image analysis," Medical Imaging 2011: Computer-Aided Diagnosis, Mar. 3, 2011, 9 pages.

Obuchowski, "ROC Analysis," American Journal of Roentgenology, vol. 184, Feb. 2005, pp. 364-372.

Reymond et al., Prediction of Lobar Collateral Ventilation in 25 Patients with Severe Emphysema by Fissure Analysis with CT, AJR—American Journal of Roentgenology (2013), vol. 201, No. 4, pp. W571-575, AARS, Virginia.

Sciurba et al., "A Randomized Study of Endobronchial Valves for Advanced Emphysema," The New England Journal of Medicine, vol. 363, No. 13, Sep. 23, 2010, pp. 1233-1244.

The National Lung Screening Trial Research Team, "Reduced Lung-Cancer Mortality with Low-Dose Computed Tomographic Screening," The New England Journal of Medicine, vol. 365, No. 5, Aug. 4, 2011, pp. 395-409.

Tschirren, Juerg, "Segmentation, Anatomical Labeling, Branchpoint Matching, and Quantitative Analysis of Human Airway Trees in Volumetric CT Images", Doctors Thesis for University of Iowa, Aug. 2003.

Tschirren, Juerg, "Segmentation, branchpoint matching, and anatomical labeling of human airway trees in volumetric CT images", Ph.D. Defense Presentation, University of Iowa, Jul. 10, 2003.

Tschirren, Juerg, et al., "Intrathoracic Airway Trees: Segmentation and Airway Morphology Analysis from Low-Dose CT Scans", IEEE Transactions on Medical Imaging, pp. 1-11, 2005, work was supported in part by NIH grant HL-064368.

Tschirren, Juerg, et al., "Matching and anatomical labeling of human airway tree", IEEE Transactions of Medical Imaging, pp. 1-8, 2005, work was supported in part by NIH grant HL-064368.

Venuta et al., "Long-term follow-up after bronchoscopic lung volume reduction in patients with emphysema," European Respiratory Journal, vol. 39, No. 5, 2012, pp. 1084-1089.

(56) References Cited

OTHER PUBLICATIONS

Witten et al., "Data Mining: Practical Machine Learning Tools and Techniques," Morgan Kaufmann Publishers, Burlington, MA, 2011, Third Edition.
Yuan et al., "Quantification of lung surface area using computed tomography," Respiratory Research, vol. 11, No. 153, 2010, 9 pages.
Zach et al., "Correlations of CT Low Attenuation Cluster Size with Visually Assessed Extent and Pattern of Emphysema," ATS, 2013, 1 page.
International Patent Application No. PCT/US2021/026066, International Search Report and Written Opinion dated Sep. 9, 2021, 30 pages.
Auzinger et al., "Vessel Visualization using Curved Surface Reformation," IEEE Transaction on Visualization and Computer Graphics, vol. 19, No. 12, Dec. 1, 2013, pp. 2858-2867.
"COPD Essentials for Health Professionals," Retrieved from: https://www.nhlbi.nih.gov/health/educational/copd/campaign-materials/html/providercard.htm on Aug. 18, 2014, 2 pages.
Frangi, A. et al., "Multiscale Vessel Enhancement Filtering," MICCAI 1998; 1496 (3), pp. 130-137.
Herth, F.J.F et al., "Endoscopic Lung Volume Reduction," Respiration, vol. 79, No. 1, 2010, pp. 5-13.
Kanitsar et al., "Advanced Curved Planar Reformation," IEEE Visualization 2003, Seattle, Washington, Oct. 19-24, 2003, pp. 43-50.
Kanitsar, "Curved Planar Reformation for Vessel Visualization," Dissertation, 2004, 107 pages.
Kuhnigk, J-M. et al., "Lung lobe segmentation by anatomy-guided 3D watershed transform," Proceedings of SPIE Medical Imaging, vol. 4, 2003, pp. 1482-1490.
Magnussen, H. et al., "Effect of fissure integrity on lung volume reduction using a polymer sealant* in advanced emphysema," Thorax, vol. 67, No. 4, 2012, pp. 302-308.
Noppen, Marc, "Collateral Ventilation in End-Stage Emphysema: A Blessing or a Curse for New Bronchoscopic Treatment Approaches (or Both)?" Respiration, vol. 74, No. 5, Jan. 2007, pp. 493-495.
Odry et al., "Automated detection of mucus plugs within bronchial tree in MSCT images," Proceedings of SPIE, vol. 6511, Mar. 2007, 10 pages.
Pu, J. et al., "Computerized assessment of pulmonary fissure integrity using high resolution CT," Medical Physics, vol. 37, No. 9, Sep. 2010, pp. 4661-4672.
Pu, J. et al., "Pulmonary Lobe Segmentation in CT Examinations Using Implicit Surface Fitting," IEEE Transactions on Medical Imaging, vol. 28, No. 12, Dec. 2009, pp. 1986-1996, Abstract and author manuscript provided.
Riquet, M. et al., "Lung cancer invading the fissure to the adjacent lobe: more a question of spreading mode than a staging problem," European Journal of Cardio-Thoracic Surgery, vol. 41, 2012, pp. 1047-1051.
Rodarte, J.R. et al., "Regional lung strain in dogs during deflation from total lung capacity," Journal of Applied Physiology, vol. 85, 1985, pp. 164-172.
Saroul et al., "Exploring curved anatomic structures with surface sections," IEEE Visualization 2003, Annual IEEE Conference on Visualization, New York, NY, Oct. 19, 2003, pp. 27-34.
Saroul, "Surface Extraction and Flattening for Anatomical Visualization," Thesis No. 3575, University of Saint-Etienne, France, 2006, 135 pages.
Sterman, D.H. et al., "A multicenter Pilot Study of a Bronchial Valve for the Treatment of Severe Emphysema," Respiration, vol. 79, No. 3, 2010, pp. 222-233.
Strange, C. et al., "Design of the Endobronchial Valve for Emphysema Palliation Trial (VENT): a non-surgical method of lung volume reduction," BMC Pulmonary Medicine, vol. 7, Jul. 3, 2007, 12 pages.
Ukil, S et al., "Anatomy-Guided Lung Lobe Segmentation in X-Ray CT Images," IEEE Transactions on Medical Imaging, vol. 28, No. 2, Feb. 2009 pp. 202-214, Abstract only.
Van Rikxoort, E.M. et al., "Automatic Segmentation of Pulmonary Segments From Volumetric Chest CT Scans," IEEE Transactions on Medical Imaging, vol. 28, No. 4, Apr. 2009, pp. 621-630, Abstract only.
Van Rikxoort, E. et al., "A method for the automatic quantification of the completeness of pulmonary fissures: evaluation in a database of subjects with severe emphysema," European Radiology, vol. 22, 2012, pp. 302-309.
Washko G.R. et al., "Physiological and Computed Tomographic Predictors of Outcome from Lung Volume Reduction Surgery," American Journal of Respiratory and Critical Care Medicine, vol. 181, No. 5, 2010, pp. 494-5000.
Wiemker et al., "Unsupervised Extraction of the Pulmonary Interlobar Fissures from High Resolution Thoracic CT Data," International Congress Series 1281, 2005, pp. 1121-1126.
Zhou, X. et al., "Automatic recognition of lung lobes and fissures from multi-slice CT images," Proceedings of SPIE Medical Imaging, vol. 5370, 2004, pp. 1629-1633.
Valipour et al., "Patterns of Emphysema Heterogeneity," Respiration, Oct. 3, 2015, 10 pages.

* cited by examiner

SUBJECT SPECIFIC COORDINATIZATION AND VIRTUAL NAVIGATION SYSTEMS AND METHODS

RELATED MATTERS

This application claims the benefit of U.S. Provisional Patent Application No. 63/006,691 filed Apr. 7, 2020. The entire contents of this application is incorporated herein by reference.

BACKGROUND OF THE INVENTION

Systematic visualization and interrogation of anatomical structures such as the lungs is often used when diagnosing ailments, planning surgeries, and the like. However, the visualization and interrogation is often challenging due to the complex branching patterns of the anatomical structure. For example, the underlying airway and vascular trees of the lungs and their spatial orientation with the surrounding tissue can yield difficulties for physicians when observing them. Accordingly, when radiological analyses of individual vessels or airway branches are required, the organization of these analyses is usually ad hoc and may vary greatly across users. Since it is often the case that the anatomical structure of interest must be traversed path by path, previous techniques can amount to a very large number of individual inspections, and thus a complicated and tedious workflow.

Furthermore, the spatial organization of the lungs and other anatomical structures is not always compatible with Euclidean space. This can make most ordinary cut-surface views sub-optimal and navigating an anatomical structure cumbersome. Also, the complexity of the anatomical structure can lead to misinterpretations of the data, resulting in confusion, a misdiagnosis, or the like. Accordingly, a more intuitive visualization of anatomical structures may help expedite procedures and also lead to more accurate analyses.

SUMMARY

In general, various embodiments described herein relate to systems and methods for analyzing an anatomical structure of a patient. In some embodiments, this may comprise generating one or more diagrams representing lung airway trees and/or other complex anatomical structures. The embodiments described herein can be used in an exemplary application to help a physician or other user visualize a patient's lungs.

One embodiment includes a method for analyzing an anatomical structure of a patient. This method may include receiving volumetric scan data representative of three-dimensional features of the anatomical structure, mapping the features to a node tree diagram, and displaying the node tree diagram. The features of the anatomical structure may comprise branching points, pathways connecting the branching points, and three-dimensional location data representative of the position of the branching points and the pathways. In parallel, the node tree diagram may have a plurality of nodes each representing branching points in the anatomical structure as well as branches representing the pathways of the anatomical structure.

In the node tree diagram, the plurality of nodes may comprise a first root node and one or more additional nodes. The first root node can represent a root branching point in the anatomical structure and the one or more additional nodes may represent one or more additional branching points in the anatomical structure. The plurality of nodes and branches of the node tree diagram can be arranged with the first root node being located centrally and the additional nodes being positioned a distance form the first root node. In some embodiments, the position of the additional nodes may be based off of at least one of: the number of branching points between each additional branching point and the root branching point; the generational relationship between the additional branching point to the root branching point based on a standard anatomical structural model; the position of the additional nodes may be based on a pathway distance between the additional branching point and the root branching point; and the Euclidian distance between the additional branching point and the root branching point.

Furthermore, the node tree diagram may have a first set of one or more regions, wherein each region encompasses a respective portion of the node tree diagram and is representative of a defined portion of the anatomical structure. In embodiments wherein the node tree diagram is a concentric branch orbit (CBO) diagram, the first set of the one or more regions can comprise a series of concentric orbit rings surrounding the first root node. Then each of the additional nodes can be located on one of the concentric orbit rings based on the additional node's position as described herein.

Another embodiment described herein generally relates to orienting a virtual camera to provide viewing angles for viewing anatomical structure. The method may comprise receiving volumetric scan data representative of three-dimensional features of the anatomical structure; selecting a portion of the anatomical structure, the portion comprising a viewing point in a pathway connecting a first branching point and a second branching point; and determining a first optimized view direction for the first branching point and a second optimal view direction for the second branching point. In some embodiments, as described herein, the three-dimensional features of the anatomical structure can comprise branching points, pathways connecting the branching points, and three-dimensional location data of the branching points and the pathways. Furthermore, the method may comprise determining an approximated optimal view direction at the viewing point, the approximated optimal view direction having an orientation between the first optimal view direction and the second optimal view direction.

The details of one or more examples are set forth in the accompanying drawings and the description below. Other features, objects, and advantages will be apparent from the description and drawings, and from the claims

BRIEF DESCRIPTION OF THE DRAWINGS

The following drawings are illustrative of particular embodiments of the invention and therefore do not limit the scope of the invention. The drawings are not necessarily to scale (unless so stated) and are intended for use with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Various systems and methods involving one or more paradigms for parameterizing and traversing anatomical structures, such as lung airways or blood vessels are disclosed. The paradigms described herein can employ a subject-specific representation of the anatomy of the anatomical structure of interest which has been generated (either automatically, semi-automatically, or manually) from data from one or more imaging modalities. The paradigm can improve efficiency, accuracy, and confidence of the analysis over prior systems.

Figure 1A:
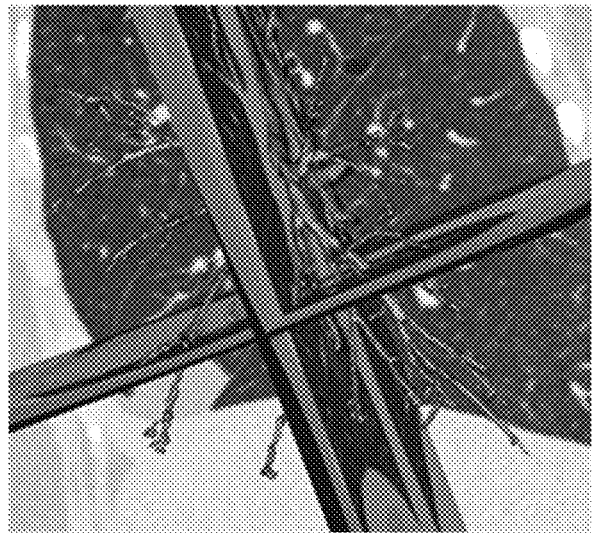
FIGS. 1A and 1B provide exemplary images of anatomical structures.
Figure 1B:

Some embodiments of the present invention are concerned with parameterizing the anatomical structure into a subject-specific and physiologically intuitive coordinate system. Such embodiments may project an underlying three-dimensional anatomical tree into a topologically equivalent node tree diagram, such as of the lungs shown in FIGS. 1A and 1B being projected onto a CBO diagram (e.g. CBO diagram 400). In some embodiments, projecting the underlying three-dimensional anatomical tree may comprise extracting the anatomical tree from one or more medical images and/or medical datasets, as discussed in herein. Alternative embodiments may use other extraction methods known to one of ordinary skill in the art.

In some embodiments, data regarding the anatomical structure (e.g. data regarding branching points and pathways connecting the branching points, and three-dimensional location data of the branching points and the pathways within the anatomical structure) may be received from multi-dimensional imaging modalities to construct a volumetric structural model of the anatomical structure. The multi-dimensional imaging modalities which may be used include but are not limited to CT scans, Mill scans, and PET scan, from which series of two-dimensional planar images can be produced in multiple planes. For example, volumetric models of an anatomical structure can be generated from a volumetric data set from a CT scan or other multi-dimensional scan of a patient. The model may be generated from the volumetric data set of the images collected via CT scanning of the anatomical structure, for example, as described in the following references, each of which is incorporated herein by reference: United States Patent Publication 2007/0092864, which is entitled: TREATMENT PLANNING METHODS, DEVICES AND SYSTEMS; United States Patent Publication 2006/0030958, which is entitled: METHODS AND DEVICES FOR LABELING AND/OR MATCHING; Tschirren et al., Intrathoracic airway trees: segmentation and airway morphology analysis from low-dose CT scans. IEEE Trans Med Imaging. 2005 December; 24 (12):1529-39; Tschirren et al., Matching and anatomical labeling of human airway tree. IEEE Trans Med Imaging. 2005 December; 24 (12):1540-7; Tschirren, Juerg, Segmentation, Anatomical Labeling, Branchpoint Matching, and Quantitative Analysis of Human Airway Trees in Volumetric CT Images, Ph.D. Thesis, The University of Iowa, 2003; Tschirren, Juerg, Segmentation Anatomical Labeling, Branchpoint Matching, and Quantitative Analysis of Human Airway Trees in Volumetric CT Images, Slides from Ph.D. defense, The University of Iowa, 2003; and Li, Kang, Efficient Optimal Net Surface Detection for Image Segmentation—From Theory to Practice, M. Sc. Thesis, The University of Iowa, 2003. Although many of the above systems and methods incorporated by reference describe imaging a bronchial tree, it should be appreciated that the systems and methods may be applied to any anatomical structure of a patient. Moreover, areas of interest within the anatomical structure or pathway planning to reach an area of interest within the anatomical structure or to traverse the anatomical structure may be received in the present design using the techniques described in the above systems and methods incorporated by reference or within the models described in the above systems and methods incorporated by reference.

Figure 2A:
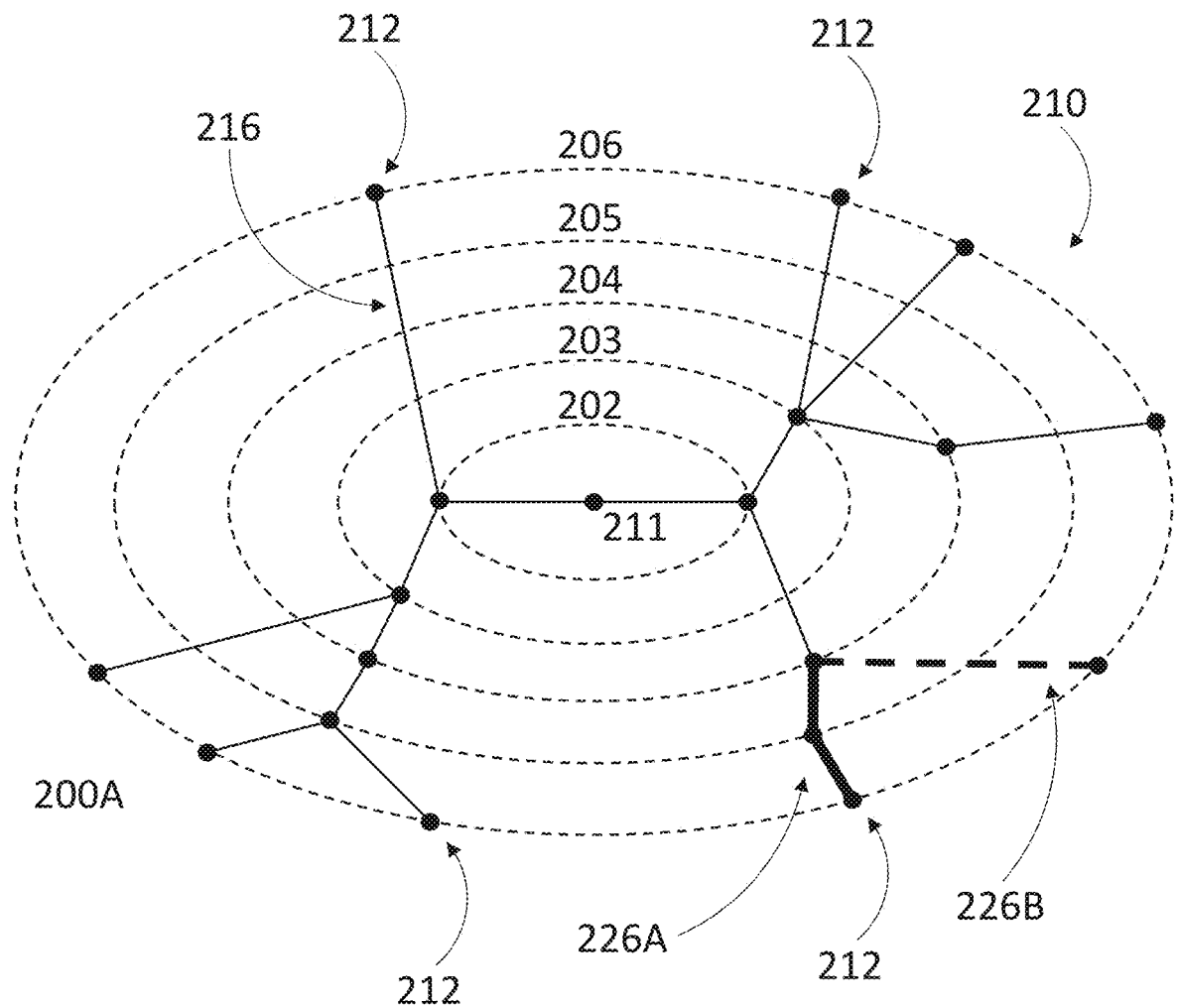
FIGS. 2A and 2B provides exemplary Concentric Branch Orbit (CBO) Diagrams.

FIG. 2A provides an exemplary two-dimensional node graph herein referred to as a Concentric Branch Orbit Diagram (CBO Diagram). With respect to FIG. 2A, CBO Diagram 200A may comprise a plurality of concentric rings (e.g. orbit rings 202-206) and a node tree 210. Node tree 210 may comprise a root node 211 as well as additional nodes 212. Node tree 210 may additionally comprise a plurality of branches 216 which connect two nodes to one another. As shown, CBO diagram 200A may additionally comprise a plurality of concentric rings (e.g. orbit rings 202-206) which can represent a defined node grouping, such that nodes occupying the same orbit ring maybe of the same node group (referred to as an "orbital group" or "orbital grouping" herein). An orbital grouping may be defined in any way known to one of ordinary skill in the art, such as by generation, whereby every child-parent relationship in nodes increases the generational count, through anatomical data (e.g. size, location, etc.) or through known relationships within the anatomical structure. In some embodiments, orbital groupings may be defined by how proximal/distal each of the additional branching points (represented by the additional nodes) are from the root branching point (represented by the root node) in the anatomical structure (e.g. a predefined structural model and/or a standard structural model known in the art). For example, the additional nodes may be spaced, such as on various orbital groupings, based on a pathway distance between each additional branching point and the root branching point and/or the Euclidean distance between the additional branching point and the node branching point. In some examples, the pathway distance may be the distance via the airways, or other the like, between two branching points.

In embodiments wherein CBO diagram 200A represents lung airways, a pulmonary arterial/venous tree, or the like, each node (e.g. root node 211 and additional nodes 212) may represent a multifurcation point (e.g. bifurcation point, trifurcation point, quadfurcation point, etc.) and each branch represents a path between multifurcation points (e.g. via an airway or blood vessel). To further the example, each orbit ring (e.g. orbit rings (202-206) may represent a generation, such that nodes occupying the same orbit ring may be of the same tree generation.

Figure 2B:
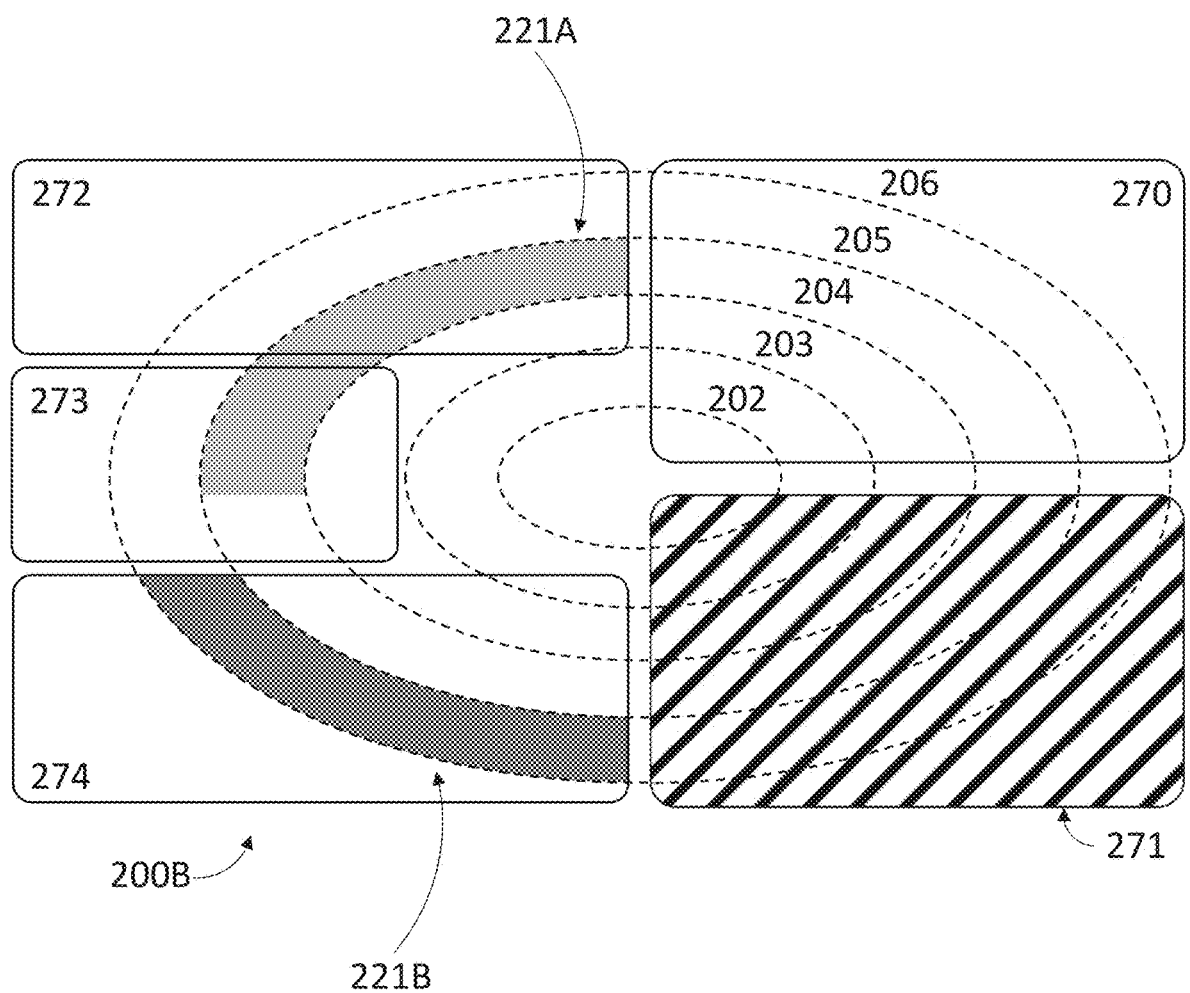

Additionally, a CBO diagram may comprise one or more defined regions, such as regions 270-275 in FIG. 2B. As shown, each region may comprise a portion of CBO diagram 200B, such as one or more portions of one or more orbit rings (e.g. orbit rings 202-206). Regions 270-275 may be any shape known to one of ordinary skill in the art, such as geometrical shapes (e.g. circles, squares, rectangles, triangles, or the like). Additionally, as shown in FIG. 2B, the defined regions need not comprise the entirety of CBO diagram 200B. However, in some embodiments the entire CBO diagram may be comprised within defined regions.

In some embodiments, as discussed herein, one or more regions may represent a defined portion of the anatomical structure, and/or a related structure, represented within the CBO diagram. For example, if the anatomical structure is a pair of lungs, region 270 may represent the left upper lobe, region 271 may represent the left lower lobe, region 272 may represent the right upper lobe, region 273 may represent the right middle lobe, and region 274 may represent the right lower lobe.

As shown in FIGS. 2A and 2B, various portions of the CBO diagram may be annotated to provide a user with contextual information. Various colors, shades, textures, and marks may be used to show various attributes of an analysis, the anatomical structure, related data (e.g. images from scans), or the like. For example, branches 226A are bolded and branch 226B has a dashed line. Such annotations may represent a variety of features as discussed further herein. Additionally, FIG. 2B shows various portions of CBO diagram 200B, such as region 271, being marked. When CBO diagrams 200A and 200B represent lung parenchyma, the annotations may represent one or more features as discussed in U.S. application Ser. No. 15/148,767, now issued as U.S. Pat. No. 10,165,964, which is incorporated herein by reference, or the like. Furthermore, various portions of the CBO diagram (e.g. CBO diagram 200B) may be annotated, such as shaded portions 221A and 221B. Annotation portions (e.g. shaded portions 221A and 221B) may be defined by aspects of the CBO diagram (e.g. regions 270-274, orbit rings 202-206, etc.), by attributes of the represent anatomical structure, user defined, or the like.

Figure 3:
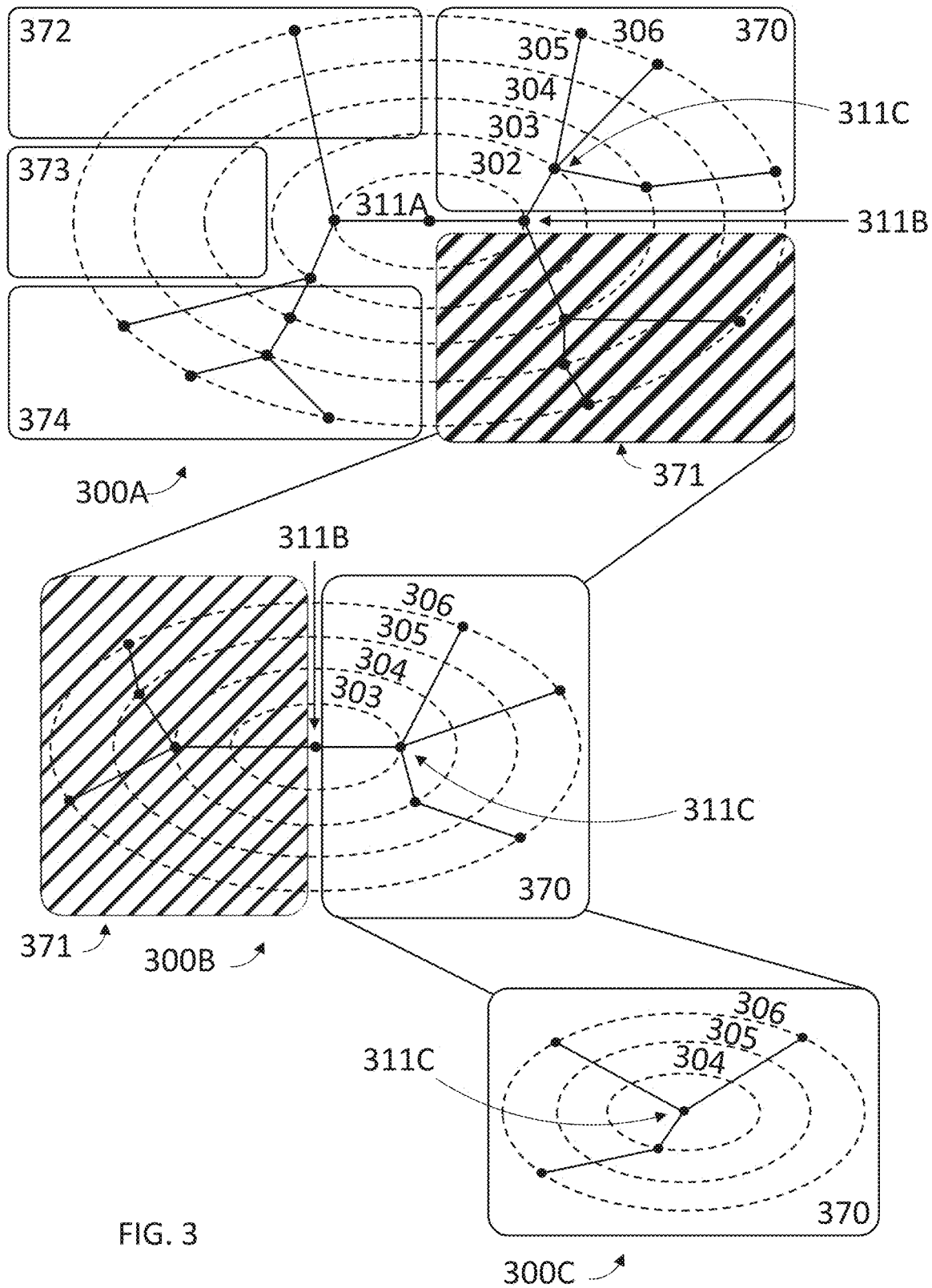
FIG. 3 provides an exemplary CBO diagrams of a lung airway tree wherein portions of the CBO diagram are magnified.

In some embodiments, a CBO diagram may be generated and stored as an image in computer memory. The CBO diagram may also be displayed. Hereinafter, when referring to displaying any imagery or visualization described, such displaying may include on a display, such as any type of electronic display device, or in a static report, such as on a printed hard copy of a document. Accordingly, the CBO diagram may also be displayed. Additionally, a user may interact with a display via a user interface. Combinations of displays and user interfaces can include computers, tablets, smart-phones, or the like. In some embodiments, the user may mark various portions of the CBO diagram via the user interface, such as annotations to various regions (e.g. regions 270-274), nodes (e.g. root node 211 and additional nodes 212) and/or branches (e.g. branches 216). FIG. 3 provides CBO diagrams 300A, 300B and 300C wherein each subsequent CBO diagram is a zoomed in portion of the previous CBO diagram. As shown, CBO diagram 300A illustrates a node tree within regions 370-374; CBO diagram 300B illustrates the node tree within regions 370 and 371; and CBO diagram 300C illustrates the node tree within region 370. As shown, each CBO diagram (e.g. CBO diagrams 300A-C) may smaller as they zoom in. For example, CBO diagram 300A comprises orbit rings 302-306; CBO diagram 300B comprises orbit rings 303-306; and CBO diagram 300C comprises orbit rings 304-306. In alternative embodiments, when zooming in on a CBO diagram, additional orbit rings may be added to show additional details not shown when zoomed out.

When zooming into a portion of the CBO diagram (e.g. CBO diagram 300A to 300B or CBO diagram 300B to 300C) a new root node may be selected. For example, CBO diagram 300A has root node 311A, CBO diagram 300B has root node 311B, and CBO diagram 300C has root node 311C. In some embodiments, the new node may be selected prior to making the new CBO diagram, such as by a user via a user interface. Additionally or alternatively, one or more nodes and/or one or more portions of a CBO diagram may be selected to populate the new CBO diagram. Furthermore, even though FIG. 3 provides an exemplary embodiment wherein a CBO diagram is enhanced, or zoomed it (e.g. CBO diagram 300A to 300B to 300C); in some embodiments it may be possible to zoom out (e.g. CBO diagram 300C to 300B to 300C). In such embodiments, zooming out may happen at a variety of rates, such as by choosing the next available root node, showing the next available orbit ring, showing a neighboring designated region, or the like.

Figure 4:
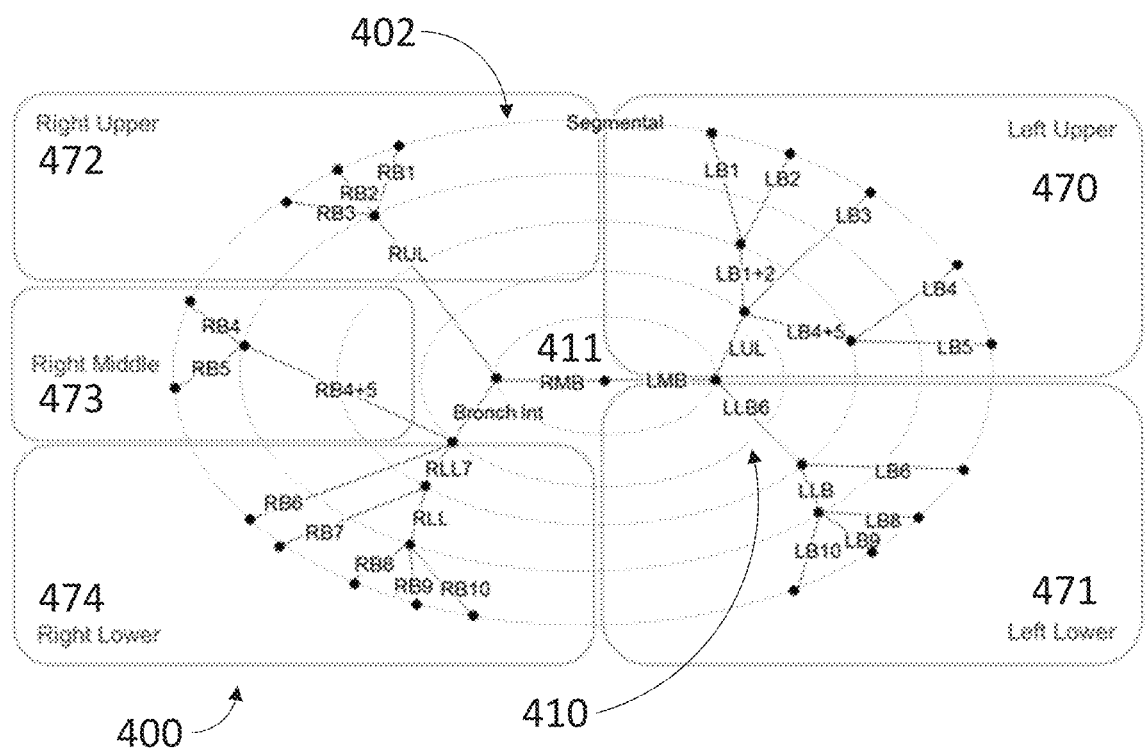
FIG. 4 provides an exemplary CBO Diagram for a lung airway tree.

FIG. 4 provides a non-limiting example wherein CBO diagram 400 represents lung airways of a patient. As shown, CBO diagram 400 comprises a node tree 410 representing the patient's airways and orbit rings 402 centered around root node 411 (representing the trachea). Orbital groups (e.g. orbit ring index locations as discussed above with respect to FIGS. 2A, 2B, and 3) can follow the naming and generational designation of the standard tracheobronchial tree. The distal most orbit ring corresponds to airways at the "segmental" generation, but other examples could expand beyond this limit. Regions 470-474 are overlaid to further group the airway branch nodes according to which lung lobe they are located in. Even though FIG. 4 provides an example for the airway tree of a particular subject, a similar diagram may be used for modeling pulmonary arterial or venous trees or the like.

Figure 5:
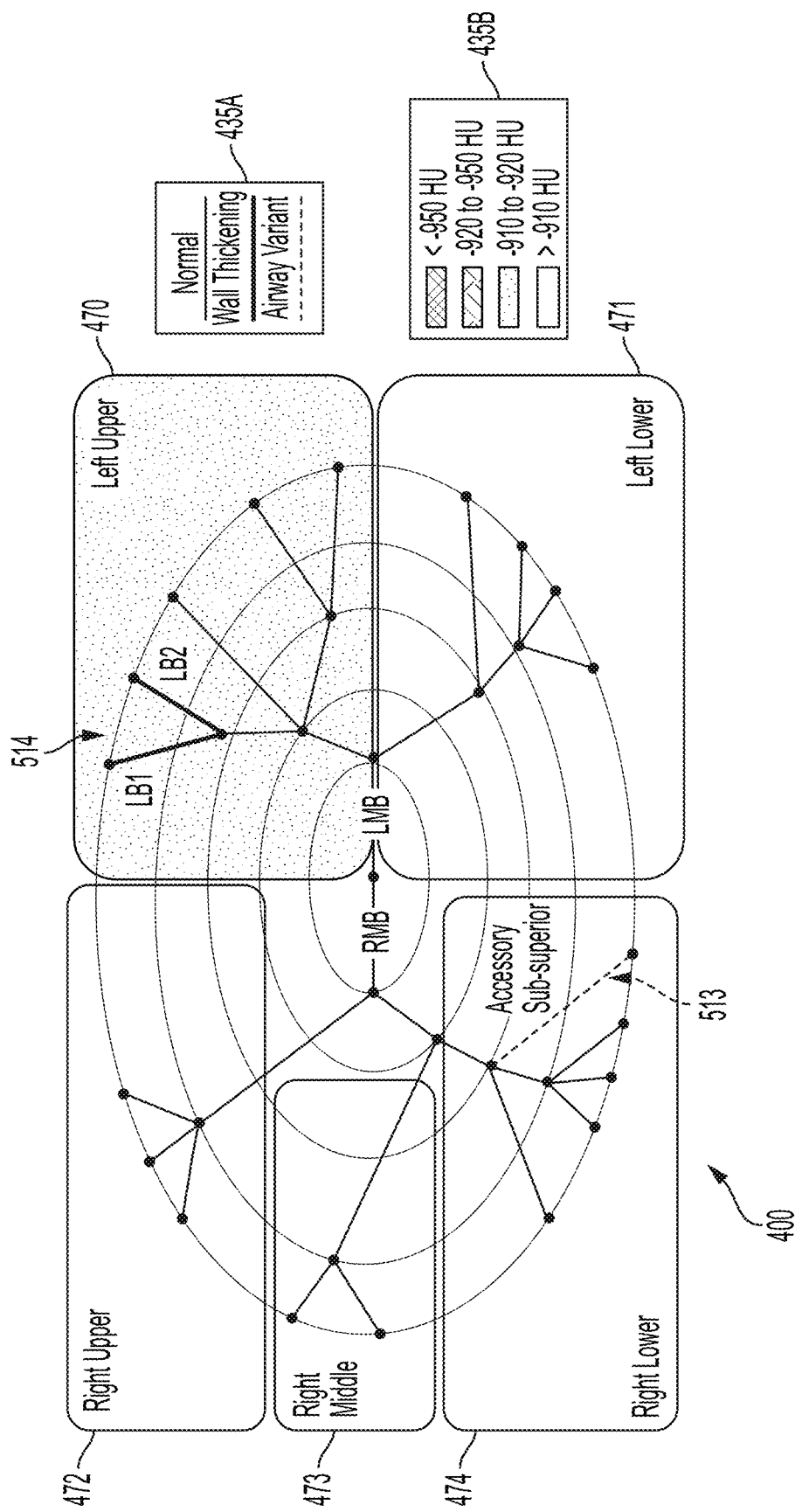
FIG. 5 is an exemplary CBO diagram of a lung airway tree with annotations.

In various embodiments, CBO diagram 400 could be further annotated with various measurements, findings, anatomical features, procedural targets, interventional targets, or the like. For example, FIG. 5 highlights various airway branches with particularly high airway wall thickness (e.g. bolded branches 514). In some embodiments, certain congenital and/or pathological variations within the anatomical structure of interest may be shown in the CBO diagram, as it can be laid out based on the specific anatomy of the represented subject's anatomical structure. For instance, it is known that lung airway branching patterns may vary across individuals and that certain patterns are associated with increased risk of particular diseases, and may be annotated accordingly on a CBO diagram. For example, CBO diagram 400 annotates an exemplary airway branch that is a known and potentially pathologically significant physiological variant (dashed branch 513). Additionally or alternatively, various regions can also be overlaid or otherwise illustrated within the diagram. As shown, various regions may be shaded based on whether or not they exhibit low densities, a characteristic of emphysema. As shown, region 470 is shaded a light grey which corresponds to −901 to −920 HU. Similarly, regions 470 and 474-474 are shaded white, or clear, which corresponds to less than −910 HU. Legends, such as legends 435A and 435B may be present to help a user identify what each annotation represents.

As discussed herein, various attributes of an anatomical structure may be presented to a user through annotations of a CBO diagram, node tree diagram, or the like. For example, when viewing the lungs, attributes may include or be related to: texture quantification, total lung and/or lobe volume, tissue mass, air volume, low attenuation areas, high attenuation areas, heterogeneity score, low attenuation cluster slope, vascular volume, percentage of the vascular volume made up from small peripheral vessels, fissure integrity, regional histogram characteristics (e.g. density mean, standard deviation, skewness, kurtosis, or percentile-related quantifications), or the like. Similar or different attributes may be annotated when viewing other anatomical structures, such as attributes of interest to a physician.

Figure 6:
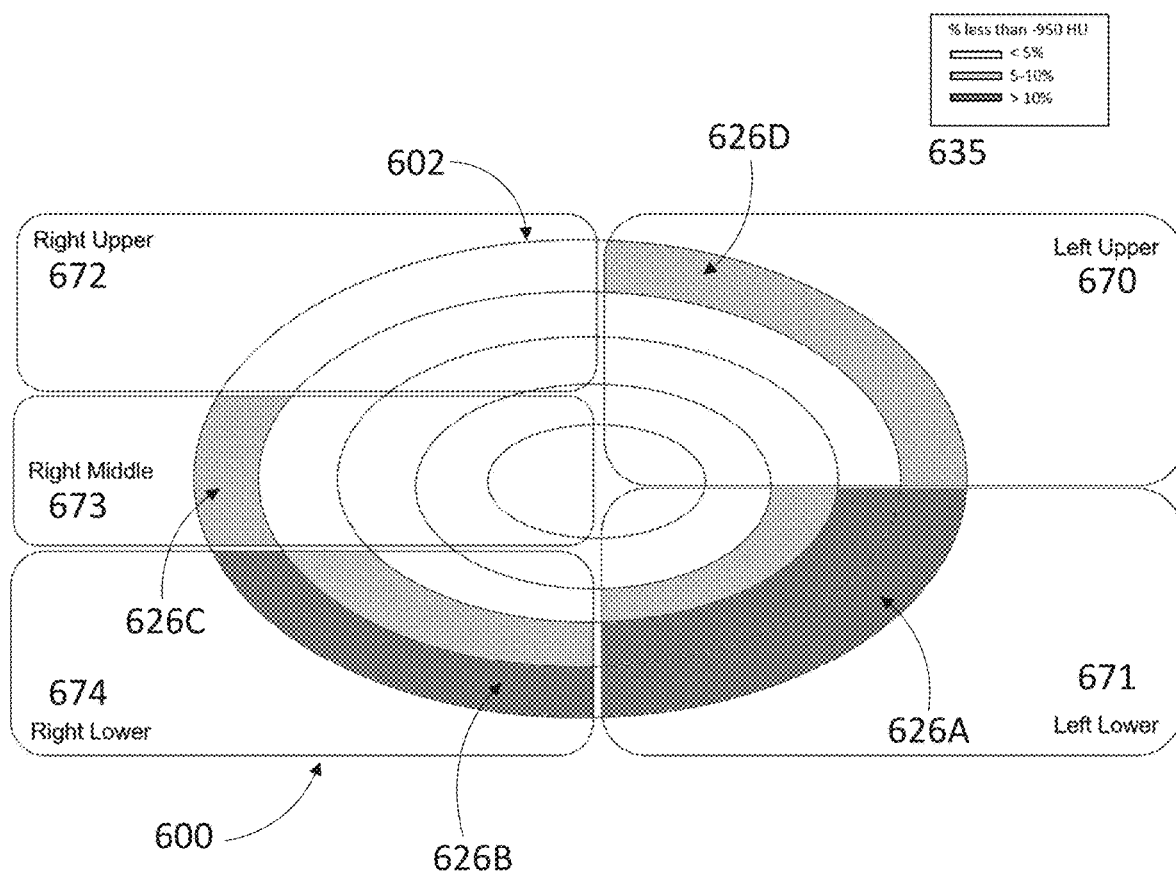
FIG. 6 is an exemplary CBO diagram of a lung airway tree with annotations.

In some embodiments, as discussed herein, the orbit rings (e.g. orbit rings 402) may provide a subdivision of the anatomical structure of interest (e.g. the lungs) into coherent spatial regions from "central" (e.g. the inner-most orbit rings) to "peripheral" (e.g. the outer-most orbit rings). For many disease states, the presence of various image features and/or characteristics and their distribution along the central-to-peripheral spectrum can be fundamental to diagnosis and staging. FIG. 6 illustrates CBO diagram 600 of a pair of lungs wherein various sections of orbit rings 602 and regions 670-674 are annotated based on the imaging modality. As shown, FIG. 6 includes a plurality of shaded zones 626A-D are shaded based on the percentage of low attenuation areas (LAA) within the various zones of the lungs ranging from most peripheral (outer-most orbit ring) to the central (inner-most orbit ring). Similar schemes can be used to indicate other properties of lung parenchyma or the like based on the imaging modality. For instance, the presence or predominance of various lung texture types commonly associated with interstitial lung disease (ILD).

Figure 7:
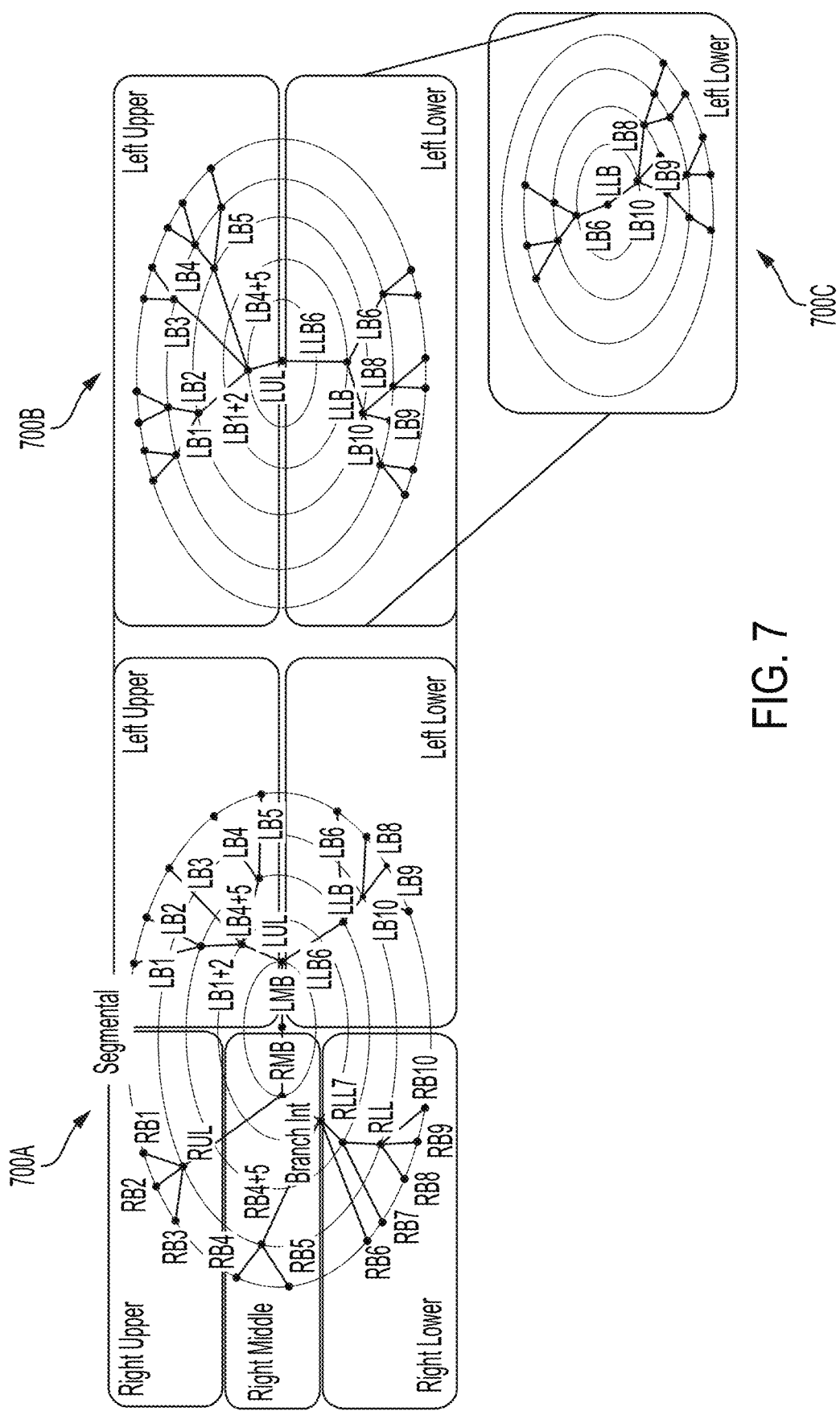
FIG. 7 provides exemplary CBO diagrams of a lung airway tree wherein portions of the CBO diagram are magnified.

As discussed in FIG. 3, various portions of a CBO diagram may be isolated and/or enhanced. Since CBO diagrams can be hierarchical, in some embodiments a similar CBO diagram can be made for any sub-tree of the overall node tree. In other words, descendent CBO diagrams may be used to "drill down" analysis of the underlying node tree to focus on particular portion of interest within an anatomical structure. For example, both the vascular and airway trees of the lungs typically consist of two major left and right subtrees at the highest level (e.g. the left lung and the right lung). An interactive application, such as a user interface and/or display, may provide a user with zoom controls to select one or more sub-trees to be a primary tree in a successive CBO diagram. FIG. 7 provides an example of CBO diagrams progressing from CBO diagram 700A showing the full airway tree (with the trachea as the root node); CBO diagram 700B showing the left lung sub-tree (with the left main bronchus as the root node); to CBO diagram 700C showing the LLB6 sub-tree (with the LLB6 airway segment as the root node). Such zooming, or "drill-down", operations and variations could be applied to ancestral sub-trees further and further out. As shown, when successive CBO diagrams are shown, additional peripheral orbit rings may be present, such as to provide more information to a user which may be too cluttered or confusing when looking at a larger node tree.

Figure 8A:
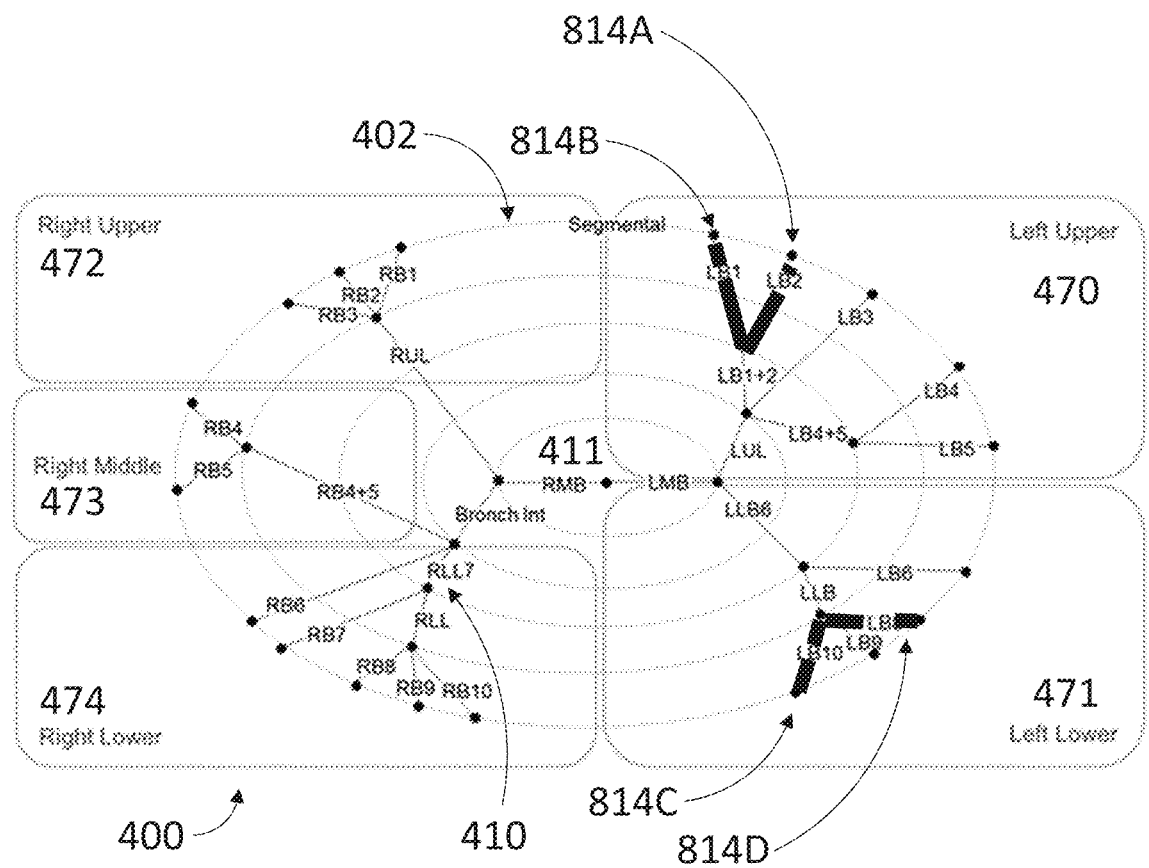
FIG. 8A-8C illustrate exemplary CBO diagrams of a lung airway tree with annotations.

Additionally or alternatively, a CBO diagram can be used to receive information from a user, such as via a user interface and/or a navigation planning system. Information received by the user and/or navigation planning system can be interpreted by a software application or the like and incorporated into a structured report of findings. Various characteristics regarding the anatomical structure of interest, such as airway characteristics like bronchiectasis, mucus plugs, etc.; or vascular characteristics such as filling defects (pulmonary emboli), stenosis, etc. can be represented via highlights or other indicators in a CBO diagram. For example, if the analysis at hand is concerned with finding and counting mucus plugs in a subject's airway tree, then the user could indicate observed plugs via direct interaction with the CBO diagram. FIG. 8A provides an example wherein a user may interact with a CBO diagram to select nodes and/or edges of node tree 410 which represents airways which comprise mucus plugs. As shown, a user may select various branches, such as branches 814A-D which may be highlighted on the CBO diagram.

Figure 8B:
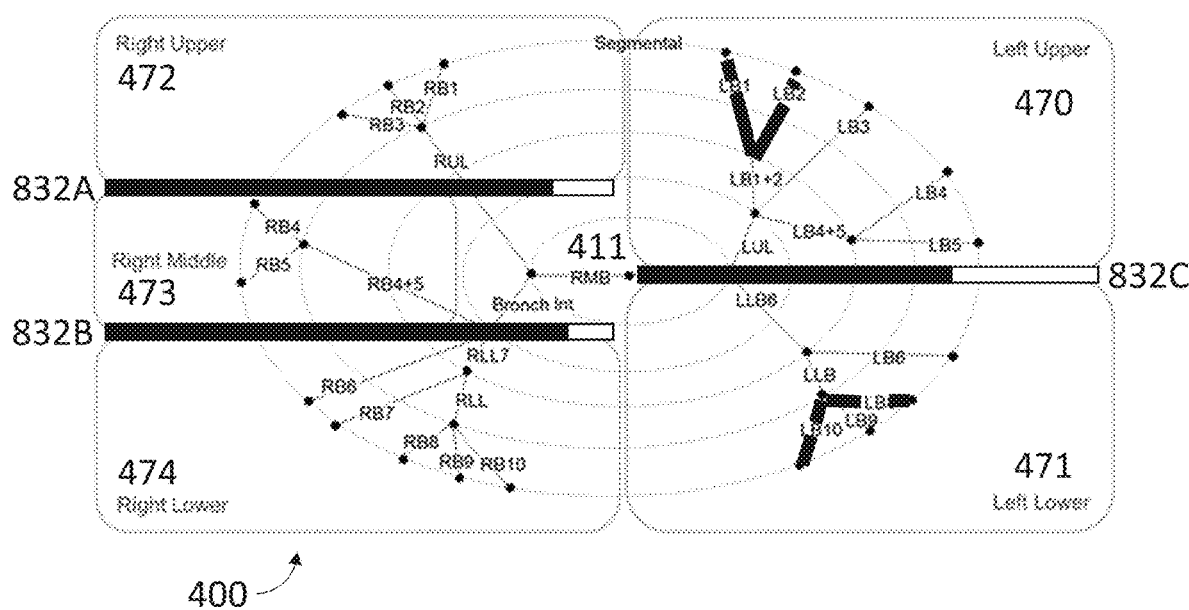

Other embodiments may comprise annotations and/or overlays to represent any number of characteristics of the anatomical structure. For instance, lobar fissure integrity may be represented. FIG. 8B shows annotations 832A-C which represent the fissure integrity between the sub-lobes of each lung. Annotation 832A represents a fissure integrity of 88% between the right upper lobe (e.g. region 472) and the right middle lobe (e.g. region 473); annotation 832B represents a fissure integrity of 91% between the right middle lobe (e.g. region 473) and the right lower lobe (e.g. region 474); and annotation 832C represents a fissure integrity of 68% between the left upper lobe (e.g. region 470) and the left lower lobe (e.g. region 471). In some embodiments, one or more annotations may include text, such as a label or to provide data to a user.

Figure 8C:
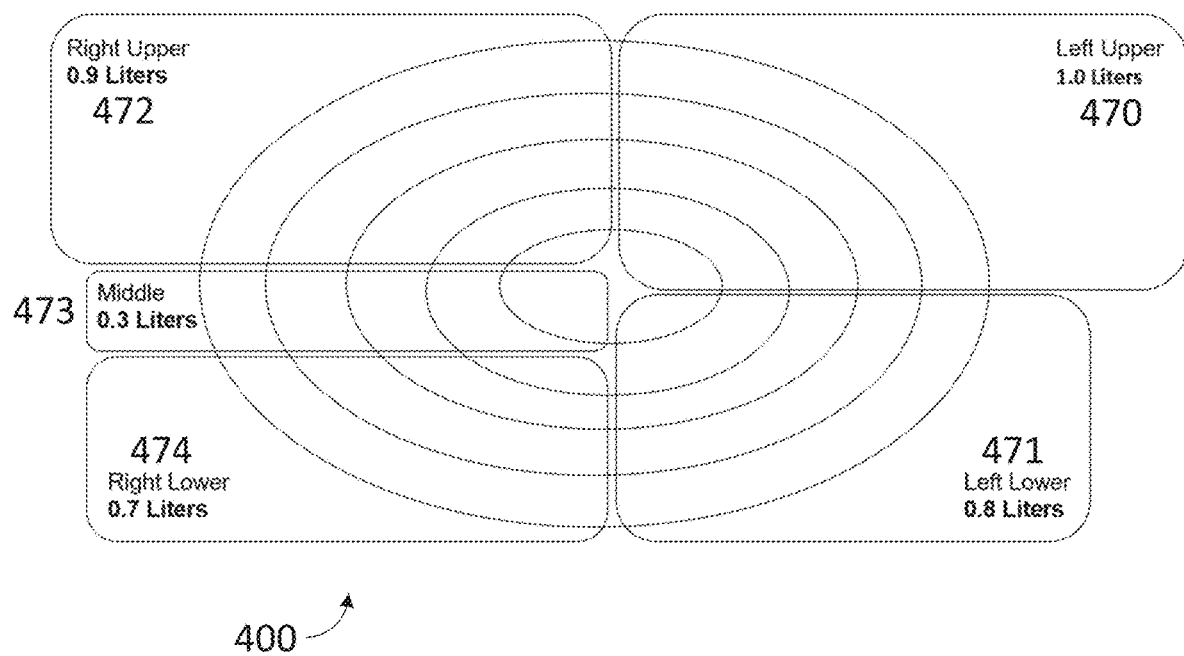

Additionally or alternatively, other characteristics may be represented in the topology of the CBO diagram. For instance, the size, weight, or other characteristics of an anatomical structure or portions of the anatomical structure may be displayed (which includes storing such an image in memory, displaying on a static report, or displayed on a display). For instance, if the anatomical structure comprises lungs, the volume of each lung or each lobe may be presented to a user. FIG. 8C provides an exemplary embodiment wherein each of regions 470-474 of CBO diagram 400 are sized based on the relative lung volume encompassed within the region. More specifically, region 470 represents the left upper lobe which has a volume of 1.0 liters; region 471 represents the left lower lobe which has a volume of 0.8 liters; region 472 represents the right upper lobe which has a volume of 0.9 liters; region 473 represents the middle right lobe which has a volume of 0.3 liters; and region 474 represent the lower right lobe which has a volume of 0.7 liters.

Figure 9A:
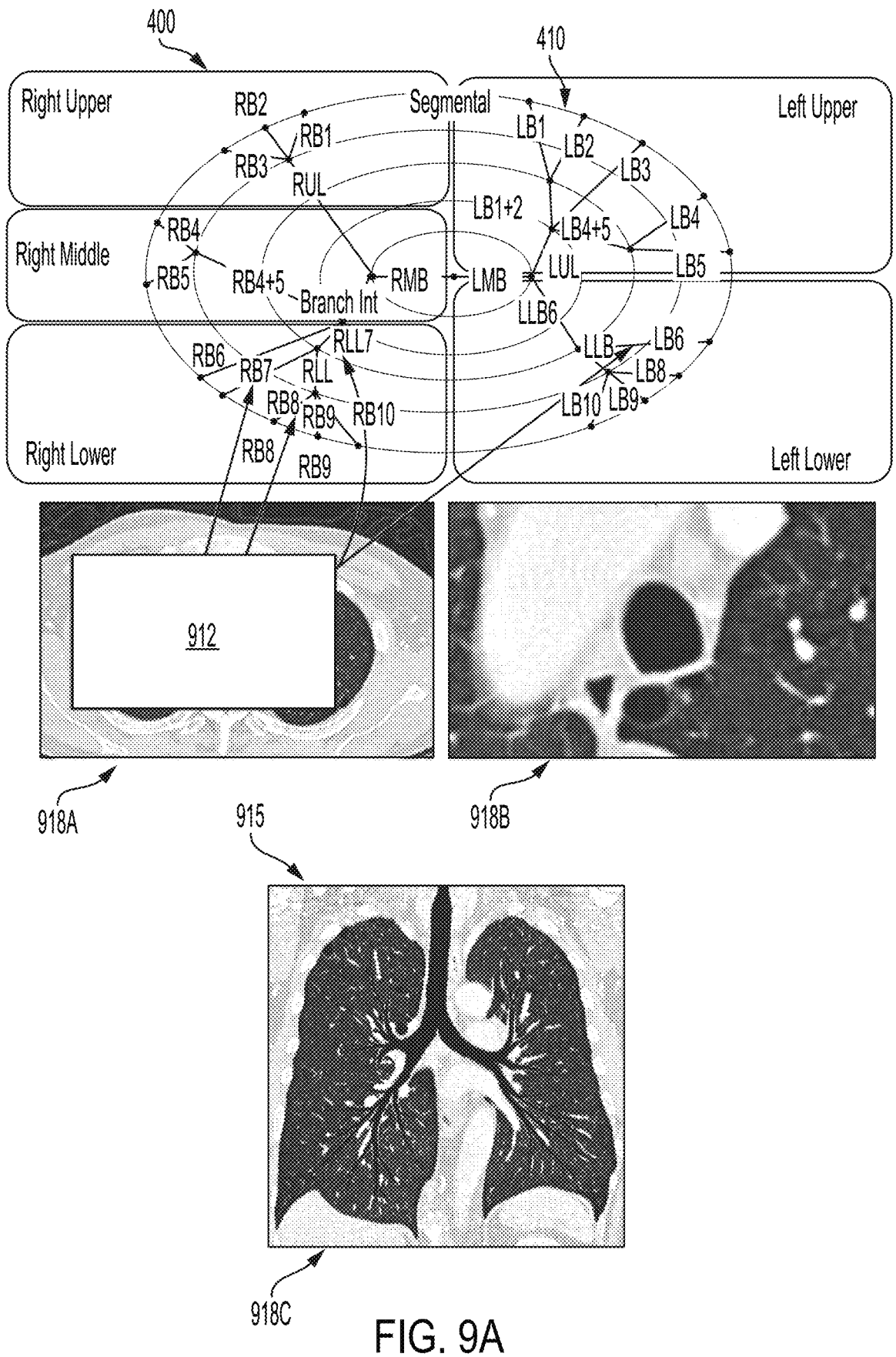
FIGS. 9A and 9B show the use of a CBO diagram along with multiple other images of lungs.

FIG. 9A provides an exemplary embodiment wherein CBO diagram 400 comprising node tree 410 is used in concert with enhanced visualization techniques (e.g. images 918A-C) to drive a workflow for thorough and systematic analysis of the patient's airway tree 915. For instance, cross-sectional views, constructed perpendicular to the central axis of a branch and displayed successively across its length, can be used to inspect the image data specific to that portion of the tree. Similarly, a cut-surface display or topographic multi-planar reformat (tMPR) provides a visualization of an anatomical structure (e.g. a patient's lungs) in a way that projects a large amount of data, specific to the anatomical structure of interest, into a single two-dimensional image. In some embodiments, using a CBO diagram (e.g. CBO diagram 400) in concert with various other visualization techniques may provide clarity and/or completeness when viewing complex structures such as lung parenchyma and/or blood vessels. Of course all such visualizations may be stored as an image in memory, displayed on a static report, or displayed on a display.

In some embodiments, a CBO diagram representation can allow a user to drive and/or track anatomically optimized visualizations along specific routes within the anatomical structure in a way that can provide intuitive and powerful control of the analysis compared to other systems and methods. For instance, a user may select (e.g. via a user interface) a location on CBO diagram 400 and be presented with a cross-sectional reformat corresponding to the selected location on CBO diagram 400. Additionally or alternatively, the user may click-and-drag the current branch either up or down the node tree 410 to either ancestral or descendent branches in the tree's hierarchy. Such interactions can allow the user to seamlessly and continuously interrogate specific parts of the tree (e.g. via the one or more reformatted visualizations) while maintaining contextual location within the overall tree (e.g. via CBO diagram 400). Furthermore, if the local visualization mechanism being used has its own mechanism for guidance and/or interaction, the CBO diagram (e.g. CBO diagram 400) may be continuously updated and used to show the user's current position in the anatomical structure and/or node tree.

In some embodiment, a CBO diagram can be used to clearly illustrate which portions of an overall anatomical structure have been visited by the user, and which portions still need to be inspected. As the user traverses various parts of the anatomical structure by a local visualization paradigm such as different generations shown in node tree 410, the CBO diagram (e.g. CBO diagram 400) can be updated/annotated (e.g. by color, line style, shape, or the like) to interactively mark the branches or portions of branches in the anatomical structure that have been viewed and/or are being currently viewed. This functionality may be useful when using cut-surface or tMPR images to interrogate the airway tree and/or sub-trees or other anatomical structures of interest. Since cut-surface displays may incorporate many, but typically not all, branches of an airway tree or other anatomical structure into a single display (static report or on a display) it may be beneficial for the user to know which branches/portions are included in the view and which ones are not. With respect to FIG. 9A, branches 812 are shown with a smaller weight to inform a user that branches 912 are not present in the respective cut-surface view. Additionally or alternatively, a CBO diagram could be used to indicate and/or record this for the user for a given cut-surface display or other image by annotating (e.g. coloring, highlighting, etc.) the branches represented in the view to allow a user to differentiate between which branches are represented in the image(s) and which branches are not.

In some embodiments wherein the CBO diagram is a one-to-one parameterization of the anatomical structure of interest, it can be easily cross-referenced to a 3D scan volume, and thus, to any reformatted image (e.g. cross-sectional image, standard axial/sagittal/coronal MPR, curved planar reformat, cut-surface display, tMPR, etc.). The cross-referenced may work in both directions. For instance, the user may click on the CBO diagram on a display (e.g. CBO diagram 400 as shown in FIG. 9A) and a reformatted image display can update to show the corresponding location in the tree. Additionally or alternatively, the user can view the tree in some reformatted image and then click on a visible portion of the anatomical structure to move a cursor or marker on a respective CBO diagram to the corresponding location.

Figure 9B:
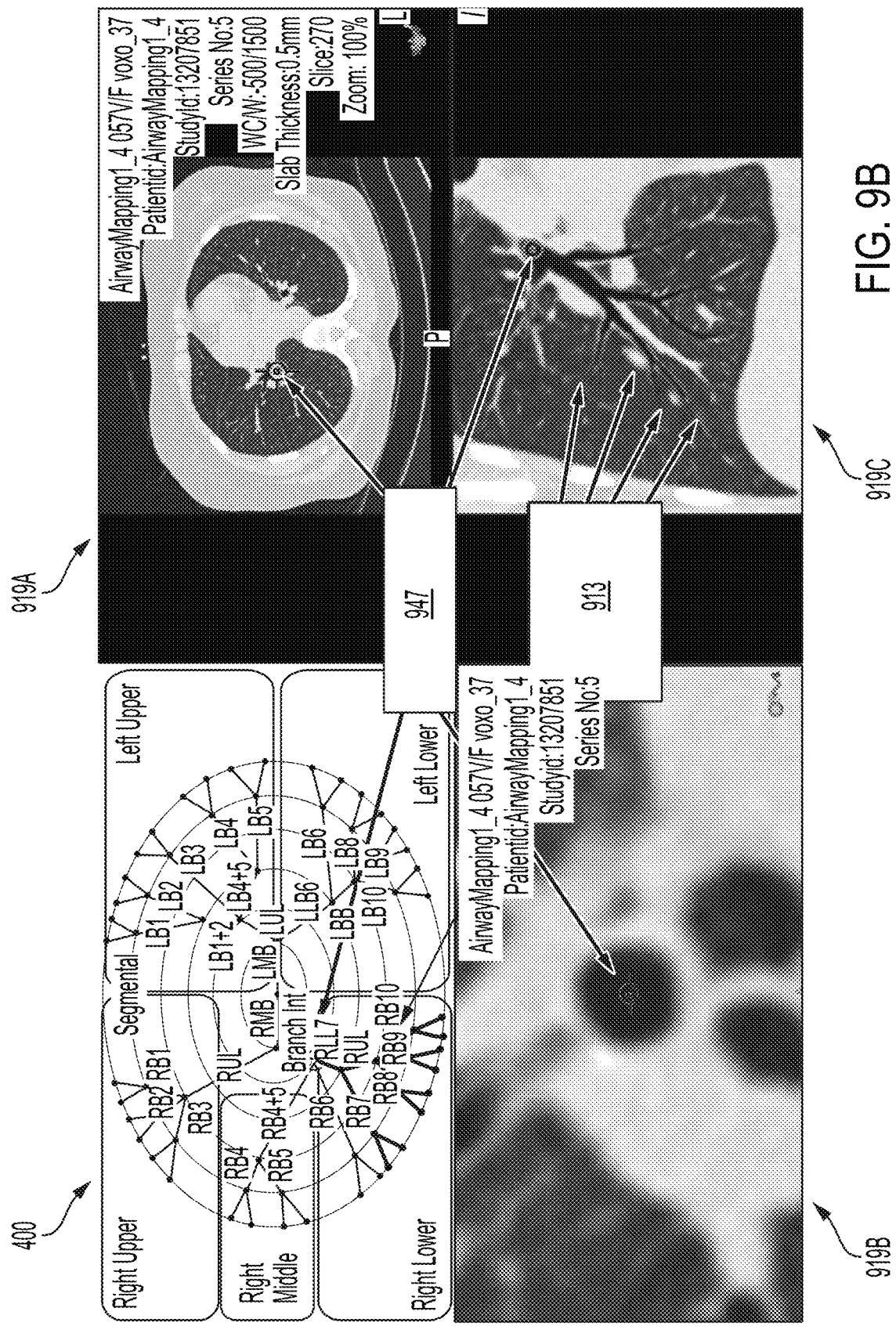

FIG. 9B provides an exemplary embodiment wherein a user may select a point (e.g. location 947) on either CBO diagram or one of the corresponding images 919A-C and it can be displayed on one or more other images. In some embodiments, a user may construct or request reformatted views to optimally visualize one or more portions of the anatomical structure that have not been seen. For example, after making a selection, such on location 947, one or more positions and/or view directions of the corresponding images may be updated to provide a view which is optimized to view the sub-tree corresponding to the selected location. With respect to the selected location 947, FIG. 9B illustrates images 919A-C being updated to display the corresponding branches 913 which descend from location 947. Subsequently, CBO diagram 400 could then be updated to include the branches represented in the current display (e.g. by bolding the lines). Additionally or alternatively, a user could select previously viewed branches or a combination of viewed and unviewed branches to be viewed with an optimal view.

As discussed herein, a cut-surface image and/or other images may be used with a CBO diagram to display as many portions of an anatomical structure (e.g. as many airways of the lungs) as possible. However, it may sometimes be impossible or challenging to do so, such as when viewing multi-generational trees such as airway and/or vascular trees found within the lungs. For example, there may be one or more branches which cannot be represented due to obstruction from other branches. To overcome this issue, an interactive mode for manipulating cut-surface view directions combined with a CBO diagram for tracking the visited portions of the anatomical structure so as to allow for exhaustive inspection.

Figure 10A:
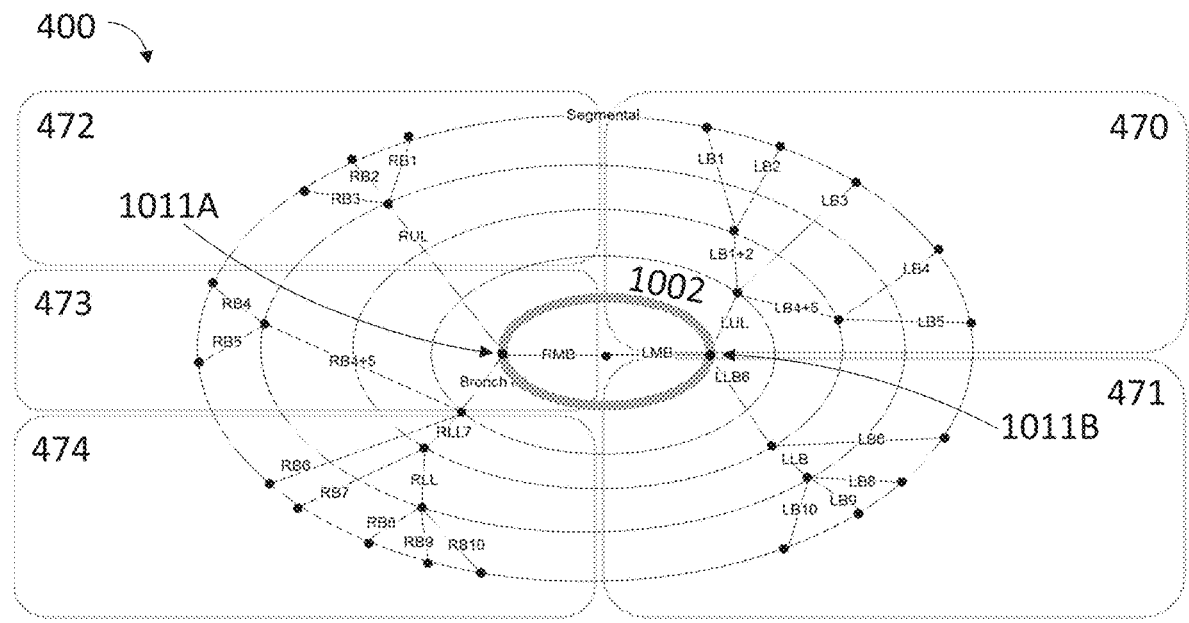
FIGS. 10A-10D show the use of a CBO diagram along with multiple other images of lungs.
Figure 10A:
Figure 10A:

FIGS. 10A-10D provide further exemplary embodiments wherein CBO diagram 400 comprising node tree 410 and orbit rings 402 is used in concert with enhanced visualization techniques to provide information about a patient's airway. As shown, various orbit rings may be selected (e.g. by a user via a user interface) and various views from locations on the one or more orbit rings may be displayed to a user. FIG. 10A provides an example wherein orbit ring 1002 comprises two nodes, node 1011A and 1011B. In this example, node 1011A represents the right mainstem bronchus (RMB) and node 1011B represents the left mainstem bronchus (LMB). In some embodiments, images of the branching points represented by one or more nodes located on the selected orbit may be displayed to a user, such as image 1021A (representing node 1011A) and image 1021B (representing node 1011B).

Figure 10B:
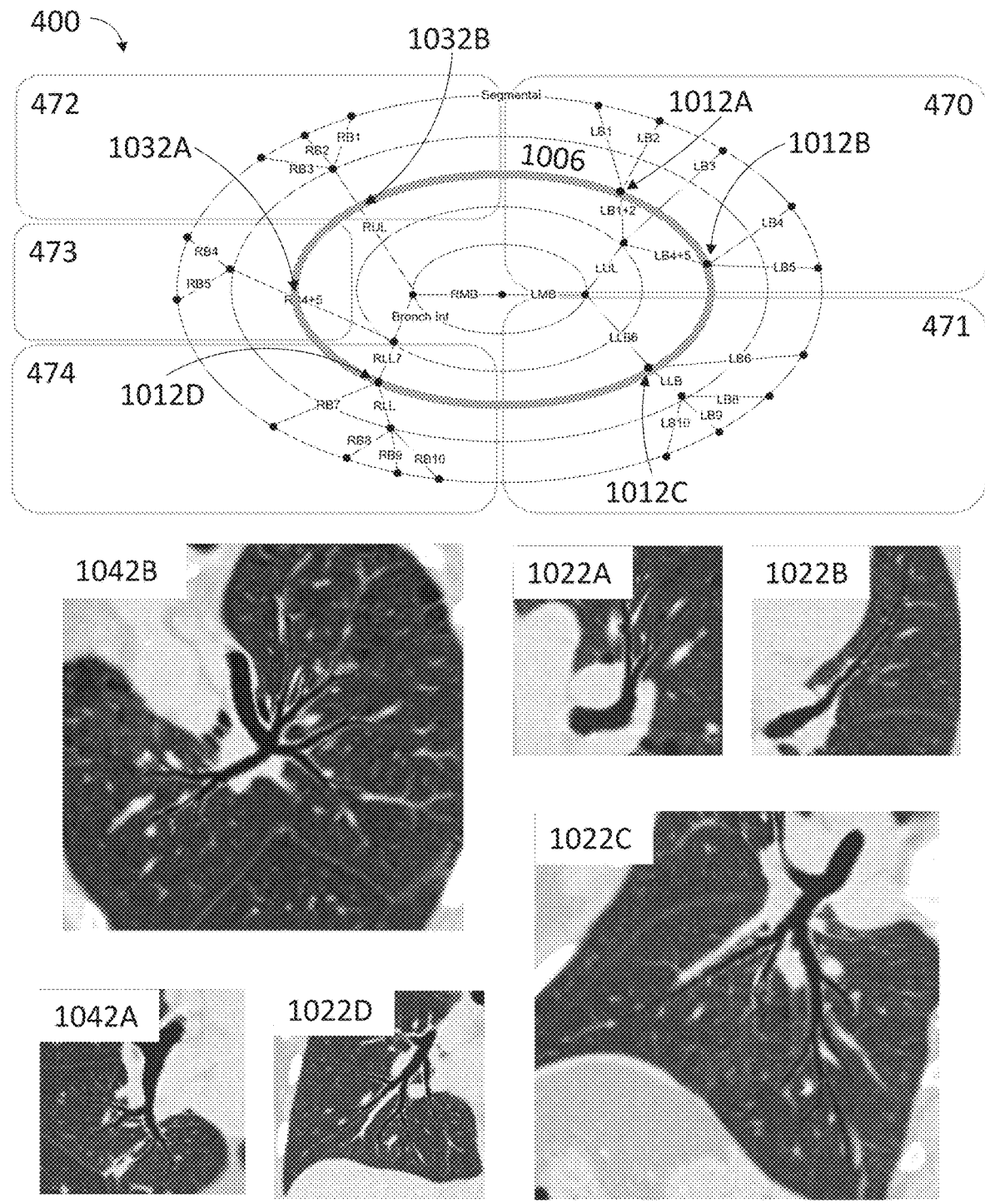
Figure 10C:
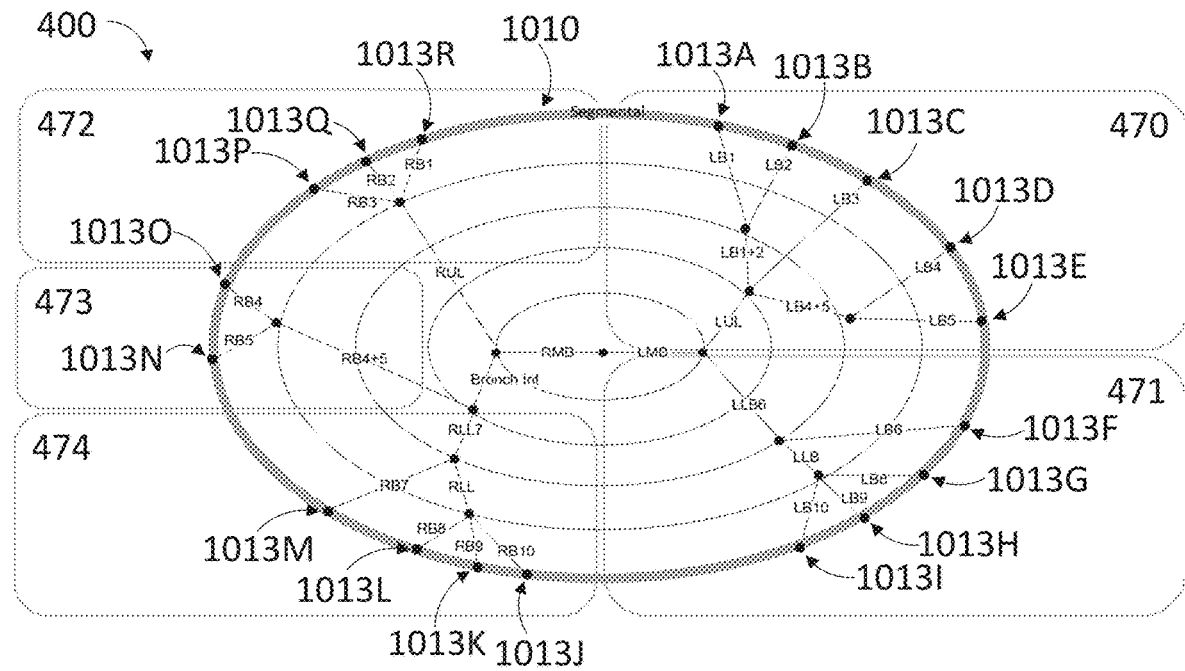
Figure 10D:
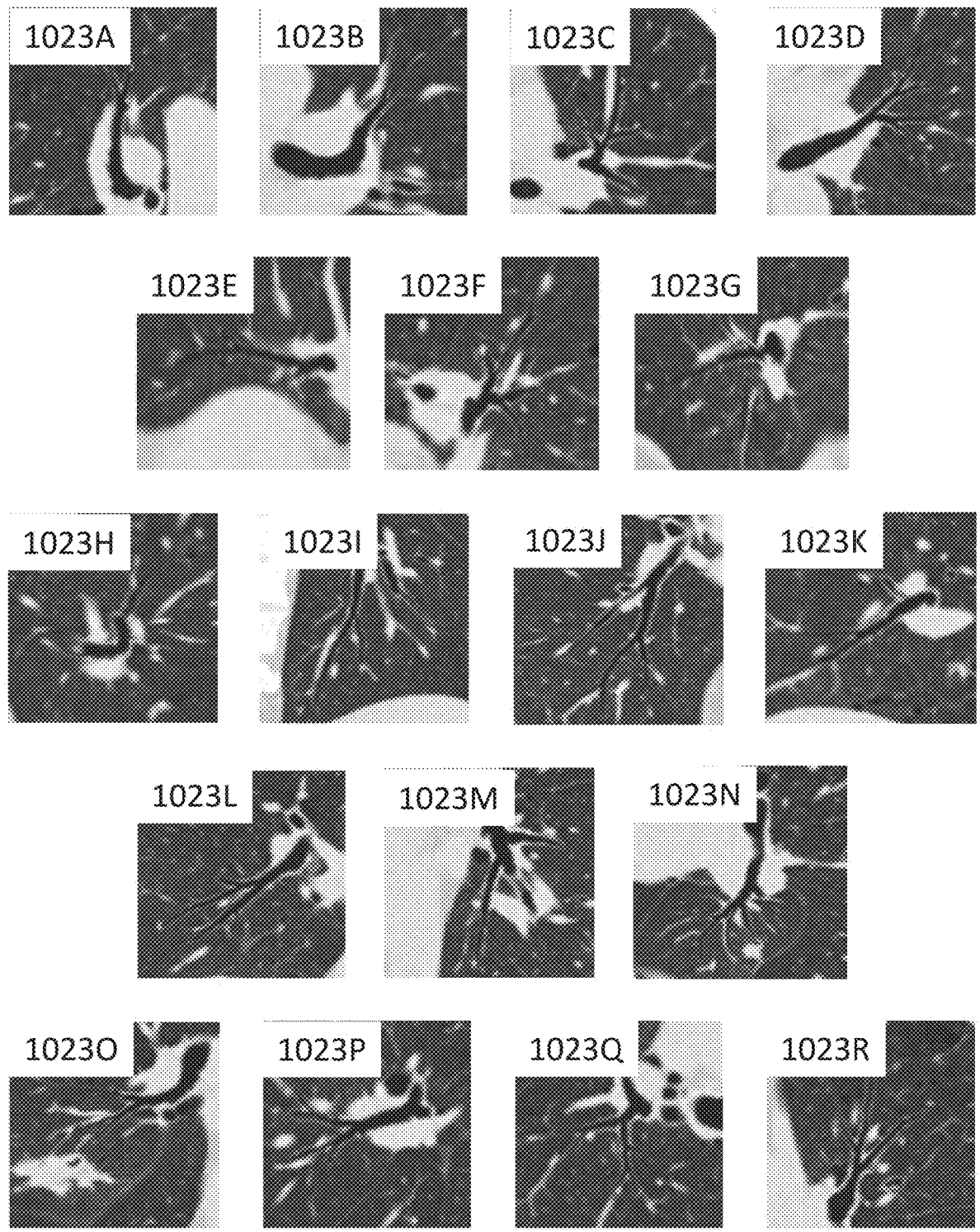

FIG. 10B then shows an example similar to that of FIG. 10A wherein orbit ring 1006 is selected rather than orbit ring 1002. Orbit ring 1006 comprises four nodes, nodes 1012A-D which represent various branching points within the patient's airway. Accordingly, one or more of images 1022A-D (representing nodes 1011A-D) may be displayed to a user. Additionally or alternatively, one or more other attributes may be displayed, such as branches intersecting with a selected orbit ring (e.g. orbit ring 1006). As shown in FIG. 10B, branch 1032A (representing the RUL branch) and branch 1032B (representing the RB4+5 branch) go through orbit 1006. In some embodiments, it may be advantageous to show a portion of the airways represented by branches 1032A and 1032B or one or more branching points located on either end of branches 1032A and 1032B. In such examples, image 1042A (representing branch 1032A) and image 1042B (representing branch 1032B) may be displayed to a user. Similar to FIGS. 10A and 10B, FIG. 10C represents an example wherein orbital ring 1010 is selected. Orbit ring 1010 comprises nodes 1013A-R which may represent various branching points in a patient's airway tree. Accordingly, FIG. 10D illustrates images 1023A-R which represent images of the patient's airways at nodes 1013A-R.

In some embodiments, such as embodiments wherein the selected orbit ring comprises many nodes (e.g. FIG. 10C), it may be beneficial to provide the images (e.g. images 1023A-R) to a user such that the user can easily interpret which image represents such node or other attribute of the CBO Diagram. In such embodiments, the images may be located around the CBO diagram and/or have lines connecting the images to the respective nodes. Additionally or alternatively, the respective node may be highlighted when an image is selected or a respective image may be selected when a node is selected. Even though not expressly illustrated, it is understood that other selections may be made than orbital rings. For example, selections may include: one or more regions (e.g. regions 470-474), a manual selection of nodes from a user, a node family (e.g. a selected node and children nodes), the use of a navigation planning system, or the like.

Figure 11A:
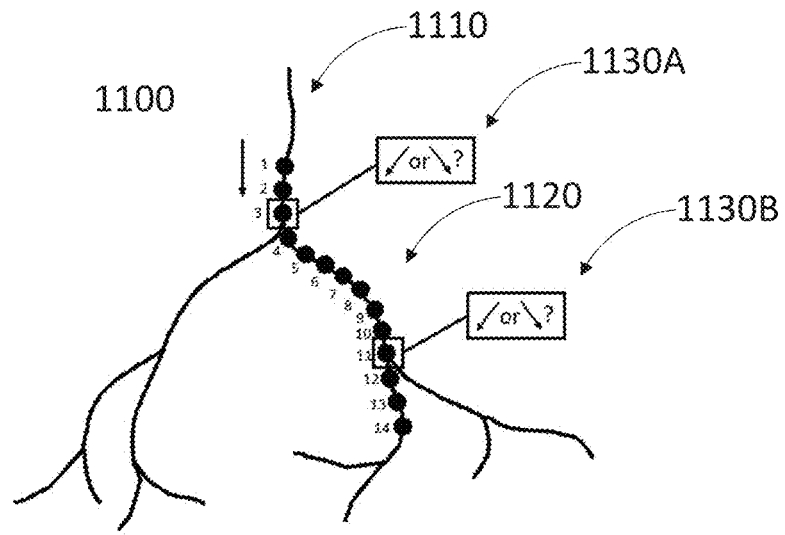
FIGS. 11A-11C show a plurality of exemplary focal points for a virtual camera within a lung airway tree.
Figure 11B:
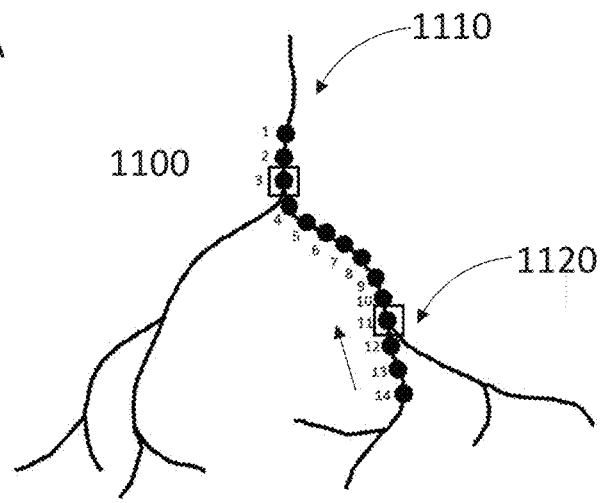
Figure 11C:
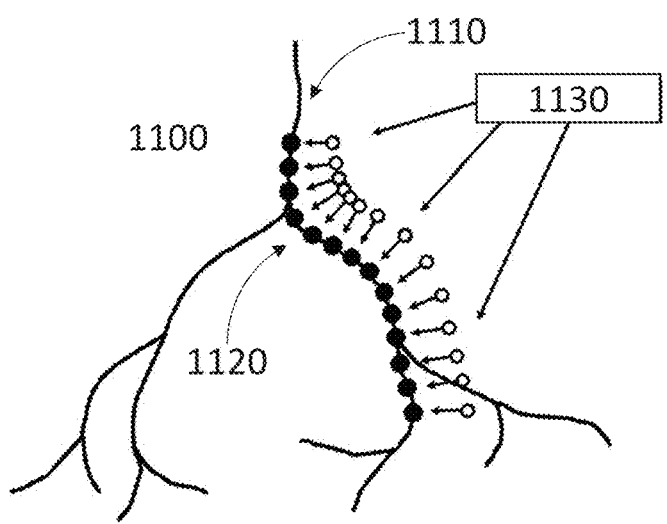

In some embodiments, manipulating the cut-surface images while traversing down various centerline paths in an anatomical structure (e.g. the lungs) may provide a more exhaustive coverage. In some examples, a cut-surface display can be constructed based on a focal point (e.g. a location within the three-dimensional volume of the anatomical structure) and a view direction looking toward the focal point. A sequence of cut-surface displays can thus be generated form a sequence of focal points paired with a sequence of corresponding view directions. FIGS. 11A-C illustrate a sequence of focal points (e.g. focal points 1120) along various branches of an airway 1100. The focal points 1120 may be positioned such that a user may traverse either up (e.g. FIG. 11A) or down (e.g. FIG. 11B) the airway tree and view various images during traversal. Furthermore, a user may select a different portion of airway 1100, or other anatomical structure, and "jump" over to the selected point for viewing. Additionally or alternatively, a navigation planning system may be used to cycle between focal points and/or portions of the anatomical structure.

In some embodiments, each focal point may be spaced by a predetermined amount, such as 0.5 mm; however, values above 0.5 mm and below 0.5 mm have been contemplated. Additionally or alternatively, focal points may be spaced based on other factors, such as the distance between two multi-furcation points and or provide a predetermined amount of focal points between two multi-furcation points. For instance, if two multi-furcation points are located close together and are at significantly different orientations, it may be necessary to provide additional focal points to provide a smooth transition between the two multi-furcation points. In as aspect of the design, focal points are not evenly spaced, but may instead be spaced relative to the amount curvature along the path. Furthermore, some embodiments may include focal points generated from a pre-define or pre-selected route through within the anatomical tree. For example, focal points may be generated along a specific route through which a bronchoscopic probe may take during a surgery (e.g. starting in the trachea and ending at a target location in a distal airway branch).

When moving "down" the airway tree, a user may be faced with various directional options (e.g. choices 1130A and 1130B) and select which child branch to continue down. When moving "up" a tree, a user may continue up the ancestral branches from each respective child branch as shown in FIG. 11B. In some embodiments, a user may freely move up/down branches freely and whenever a multi-furcation (bifurcation, trifurcation, etc.) is present chose which new branch to continue traversing.

Figure 12A:
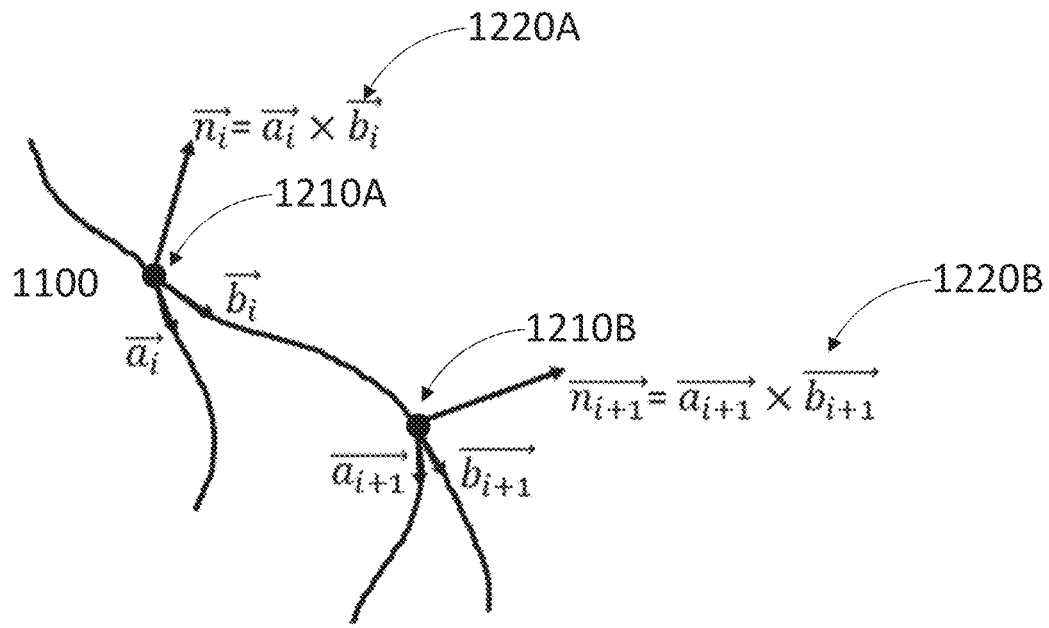
FIGS. 12A and 12B illustrates an exemplary method for computing normal vectors at bifurcation points for the focal points illustrated in FIGS. 11A-11C
Figure 12B:
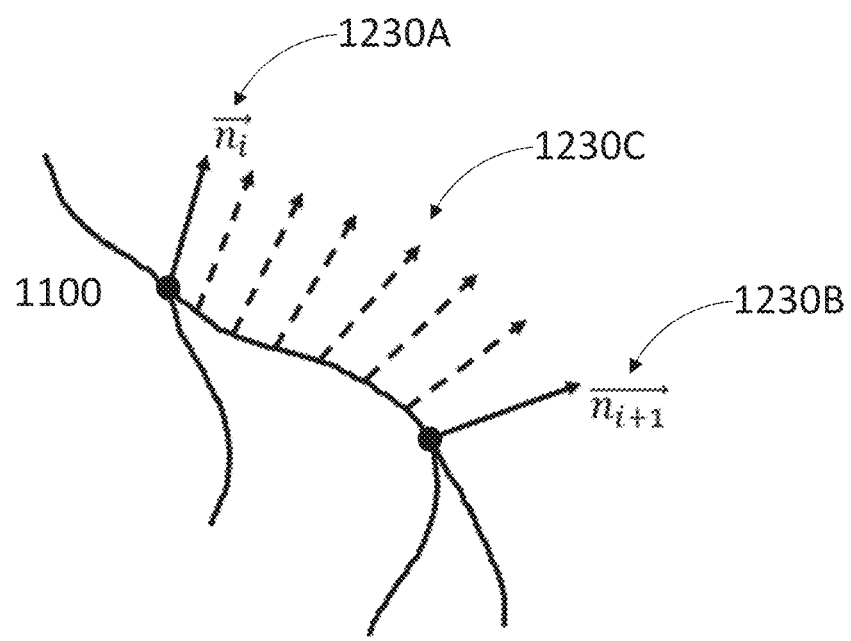

When traversing through a branch, view directions (e.g. view directions 1130) for a localized display (e.g. cut-surface image or the like) can be chosen for each focal point 1120. In some embodiment, each of view directions 1130 may be chosen in a way that is optimal for displaying the anatomical structure of interest (e.g. the airways 1100) at the given focal point. FIGS. 12A and 12B provides an exemplary embodiment of choosing optimal view directions on a portion of airway 1100 shown in FIGS. 11A-B. The optimal view directions may be first defined for each focal point 1120 defined at a multi-furcation point, such as at branching points 1210A and 1210B which are at bifurcations in airway 1100. The optimal view directions 1230A and 1230B can be defined by reversing the direction normal to the branching plane. For example, the branching plane can in turn be computed, as described in U.S. application Ser. No. 16/678,373, herein incorporated herein by reference, by averaging the cross-products of centerline directions vectors (e.g. vectors ai, $a_{i+1}$, $b_i$, and $b_{i+1}$) emanating out from the branching points 1210A and 1210B. By this mechanism, a user may see cut-surface displays that are optimal for viewing each successive branching point (e.g. branching points 1210A and 1210B) encountered along a traversal route. In some embodiments, optimal views for branching points will be made for all branching points along a traversal route, all branching points within a defined region, the branching points between a selected or currently viewed branch, or the like.

Traversing examples discussed herein generally relate to a user (e.g. via a user interface) manually traversing branching points and pathways between branching points. Additionally or alternatively, a navigation planning system may be used when viewing an anatomical structure, such as when traversing through branching points and pathways as discussed herein.

As shown in FIG. 12B, once the optimal view directions for branching points (e.g. view directions 1230A and 1230B) are determined, one or more additional view directions 1230C located on the pathway between view directions 1230A and 1230B may be calculated. The view direction of 1230C may be between the view direction 1230A and 1230B. In some aspects of the design, the view direction 1230C will depend on the location of view direction 1230C relative to the path between view directions 1230A and 1230B. That is, the viewing direction at points along the path between view directions 1230A and 1230B will transition from view direction 1230A at point 1230 to view direction 1230B at view direction 1230B. In an aspect of the design, the view direction 1230C may transition linearly or proportionally, relative to the path distance, along the path between view directions 1230A and 1230B. For examples, assume that the path distance between view directions 1230A and 1230B is 10 mm, and the to the path distance between view direction 1230A and view direction 1230C is 4 mm. In such a case, the view direction 1230C may be calculated as 40%

(4 mm/10 mm) of the smooth (linear) transition from view direction 1230A to view direction 1230B. Similarly, the view direction between two branchpoints could be computed according to the angle defined between the optimal view directions at the two branchpoints. Again, based on the example described with respect to FIG. 12B, if the path distance between view directions 1230A and 1230B is 10 mm, and the path distance between view direction 1230A and view direction 1230C is 4 mm, then the view direction 1230C may be calculated as rotating the view direction at 1230A by 40% (4 mm/10 mm) of the total angle swept out be 1230A and 1230B.

In some embodiments, the focal points (e.g. focal points 1120 on airway 1100) may be evenly distributed between each multi-furcation points (e.g. branching points 1210A and 1210B) and the one or more additional view directions 1230C may be evenly distributed accordingly. The one or more additional view directions 1230C may be calculated using other methods known to one of ordinary skill in the art.

Figure 13:
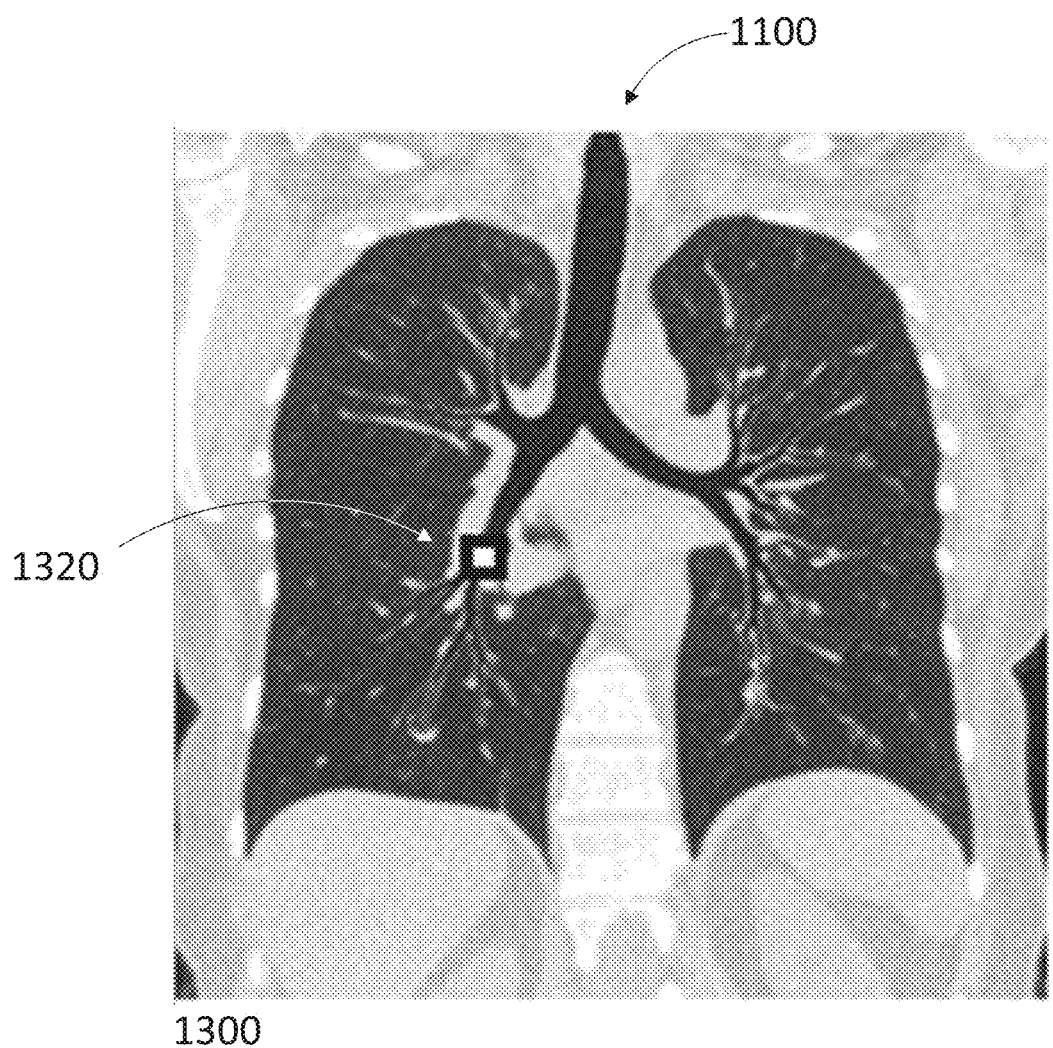
FIG. 13 shows an exemplary cut-surface image for the lung airway tree of FIGS. 11A-11C.

In some embodiments, each of the view directions (e.g. optimal view directions 1230A and 1230B as well as additional view directions 1230C) may be displayed to a user, such as via a display. FIG. 13 provides an exemplary cut-surface image 1300 of airway 1100 as described herein which may be displayed to a user. In some embodiments, a portion of the image (e.g. cut-surface image 1300 may be highlighted such as a focal point for the image.

Figures 14A, 14B:
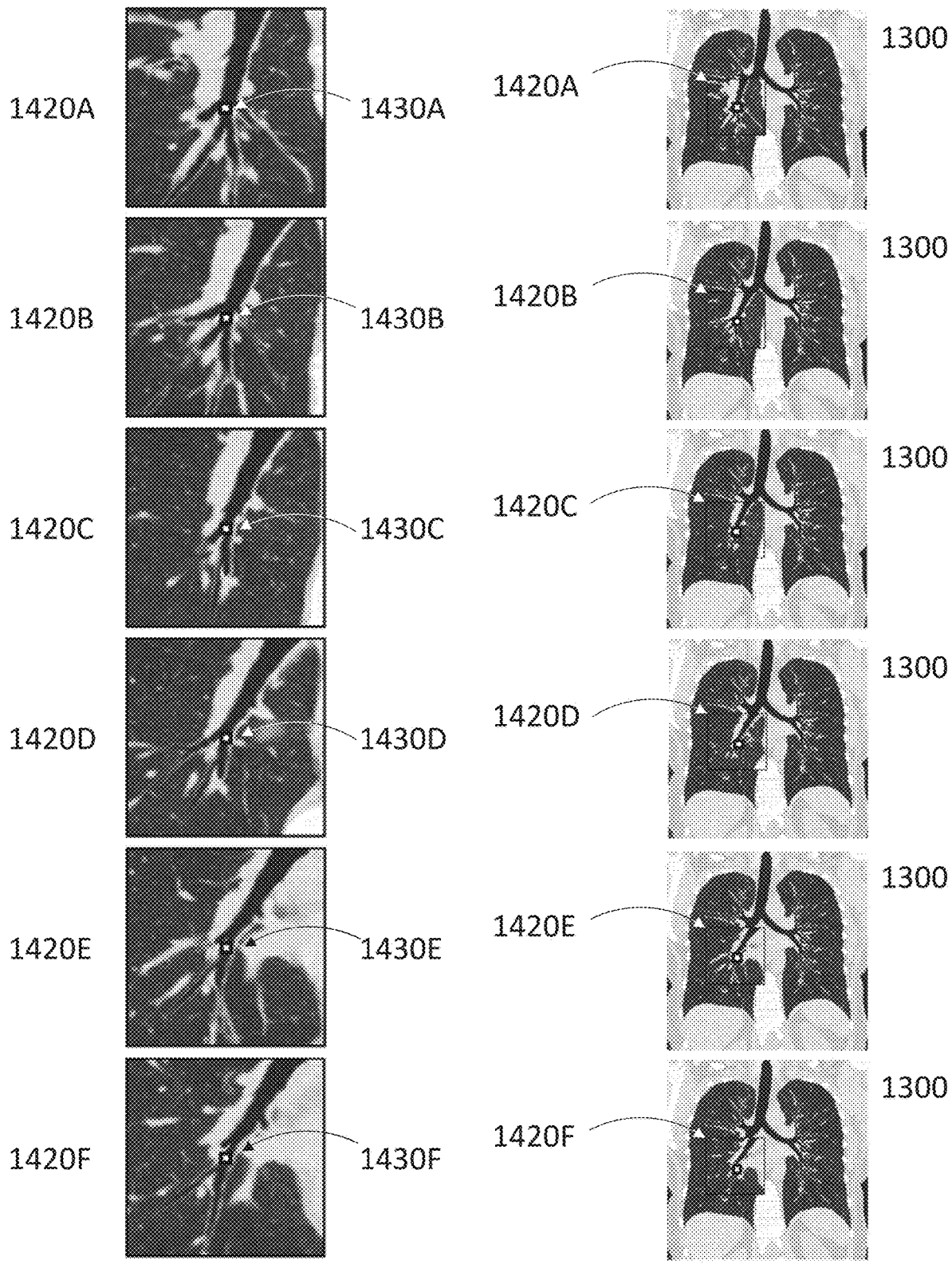
FIGS. 14A and 14B provides images of the lung airway tree of FIGS. 11A-11C from the optimal view directions of FIGS. 12B.

FIG. 14A provides cropped images of airway 1100 as shown in cut-surface image 1300 as the focal point traverses the airways 1100. As shown in FIG. 14A, the orientation of each view direction 1420A-F slightly changes as the focal points 1430A-F are cycled through to provide an optimal view direction of each focal point location, as described herein. It may be beneficial to provide position information relative to the entire anatomical structure of interest, such as the entire view of the airways 1100 as shown in cut-surface image 1300. However, providing such an image with respect to each view direction (e.g. view directions 1420A-F) may not be useful in certain situations. In some embodiments, portion of the image surrounding the focal point, such as the cropped versions of view directions 1420A-F, may be overlaid on a cut-surface image (e.g. cut-surface image 1300) which remains stationary to allow a user to see changes around a focal point while keeping the overall image the same. FIG. 14B provides an example of view directions 1420A-C being overlaid on cut-surface image 1300 as the focal points 1430A-F are cycled through.

In some modes of interrogation, a CBO diagram may additionally be used when traversing an anatomical structure of interest. For example, while cut-surface displays (e.g. FIGS. 14A and 14B) may provide rich local information about the image data surrounding a focal point, the locational context of exactly where the user is within the anatomical structure and which portions of the anatomical structure have been viewed over various displays can be difficult or impossible to track. By representing locational information on a CBO diagram, the user can be more confident that they are achieving full visitation coverage of the anatomical structure and/or confident which portions of the structure have been or have not been viewed.

Figure 15A:
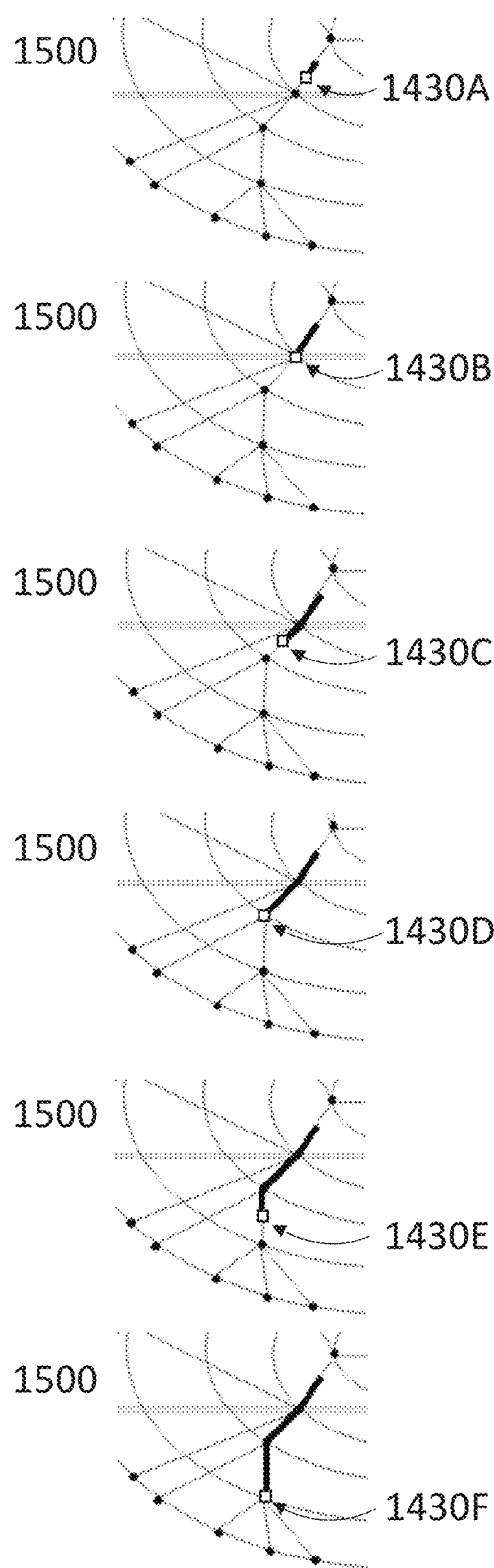
FIGS. 15A and 15B provide exemplary CBO diagrams which show the focal points of FIGS. 11A-11C.
Figure 15B:
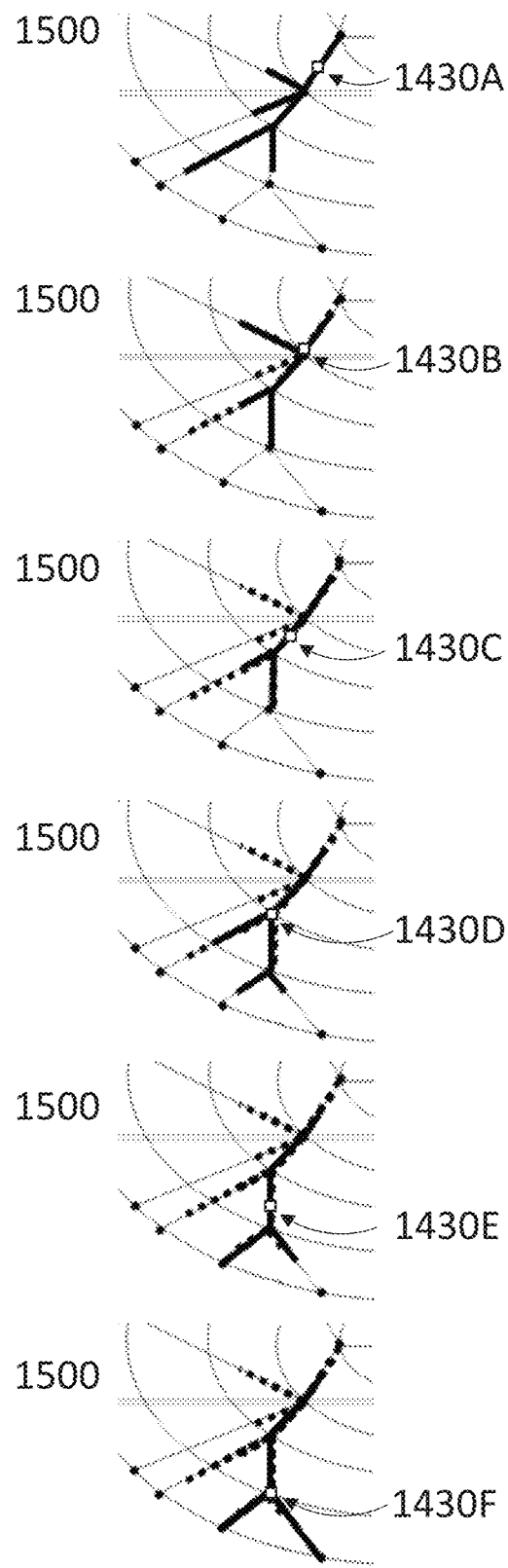

In some embodiments, as discussed herein, it may be beneficial to provide a CBO diagram while traversing an anatomical structure of interest, such as cycling through focal points 1430A-F. FIGS. 15A and 15B provide exemplary CBO diagrams which display focal points 1430A-F as discussed herein are shown in CBO diagram 1500. In some examples, a traversal path may be annotated (e.g. bolded, dashed, change of color, etc.) to signify a traversal path as focal points 1430A-F are cycled through, as shown in FIG. 15A. Additionally or alternatively, every portion of the anatomical device which is in optimal view at each given focal point may be annotated. Furthermore, in some embodiments as described herein, the CBO diagram (e.g. CBO diagram 1500) may be updated to continuously reflect every portion of the anatomical structure of interest which has been and/or is being viewed throughout a sequence of constructed displays (e.g. the sequence of cut-surface displays of airways 1100 as shown in FIGS. 14A and 14B and described herein).

For simplicity, CBO diagram 1500 is shown as a cropped version a CBO diagram (e.g. a cropped version of CBO diagram 400) for ease of reference. Alternatively, CBO diagram 1500 may provide a larger view of the anatomical structure of interest (e.g. CBO diagram 400 illustrating a pair of lungs) or be in a zoomed in version of a CBO diagram, as discussed herein.

Various embodiments have been described. Such examples are non-limiting, and do not define or limit the scope of the invention in any way. For instance, the notion of pairing an optimized visualization paradigm (such as a cut-surface, curved multi-planar reformat, cross sectional view, etc.) with a CBO diagram to track coverage maybe useful for interrogating any complex branching structure of interest, including lung airway trees, lung vascular trees (arterial or venous) coronary artery trees, cerebral artery trees, liver vascular trees (arterial, venous, and portal venous), or the like. Additionally, it will be appreciated that various features and functions as described herein can be combined into a single method or system. Additionally, it will be appreciated that various features and function as described wherein can be combined into a single method and/or system.

The invention claimed is:

1. A method for analyzing an anatomical structure of a patient, the method comprising:
    receiving volumetric scan data representative of three-dimensional features of the anatomical structure, the features comprising branching points, pathways connecting the branching points, and three-dimensional location data of the branching points and the pathways;
    mapping the features of the anatomical structure to a node tree diagram, the node tree diagram representing the anatomical structure and having:
        a plurality of nodes, each of the plurality of nodes representing a branching point in the anatomical structure and the plurality of nodes comprising:
            a first root node representing a root branching point in the anatomical structure, and
            one or more additional nodes representing one or more additional branching points in the anatomical structure,
        one or more branches, each of the one or more branches connecting two of the plurality of nodes, each of the one or more branches representing a pathway between two branching points in the anatomical structure, wherein the plurality of nodes and the one or more branches are arranged with the first root node being located centrally and the one or more additional nodes being positioned a distance from the first root node, the position of the additional nodes being based on at least one of:
            the number of branching points between each additional branching point and the root branching point, and the generational relationship between the additional branching point to the root branching point based on a standard anatomical structural model; and a series of concentric orbit rings surrounding the first root node, wherein the series of orbit rings represents one or more anatomical parameters within the anatomical structure and each of the additional nodes is located on one of the concentric orbit rings in the series of concentric orbit rings; and generating display data, the display data representative of the node tree diagram.

2. The method of claim 1, wherein the one or more anatomical parameters comprises at least one of: the pathway distance between the root branching point and the one or more additional branching points; the Euclidean distance between the root branching points and the one or more additional branching points; the diameter of pathways within the anatomical structure; and an amount of branching generations from the root branching point.

3. The method of claim 1, further comprising:
annotating the node tree diagram, wherein annotating the node tree diagram to represent one or more features of the anatomical structure; and
generating annotated display data, the annotated display data representative of the annotated node tree diagram.

4. The method of claim 3, wherein annotating the node tree diagram comprises:
adjusting at least one from the group consisting of: colors, shades, textures, text, and marks on a portion of the node tree diagram; or
adjusting at least one from the group consisting of: one or more of the plurality of nodes and one or more of the one or more branches.

5. The method of claim 1, further comprising:
providing the display data to a display; and
providing one or more images to the display, the one or more images representative of the anatomical structure.

6. The method of claim 5, further comprising:
receiving a selection on a portion of the node tree diagram; and
annotating the portion of the one or more images which is represented by the selected portion.

7. The method of claim 5, further comprising:
receiving a selection on a portion of the node tree diagram; and
adjusting at least of the one or more images to provide an optimal view for the selected portion.

8. The method of claim 7, wherein the selected portion comprises a point on the node tree diagram, and the point comprises at least one of: a node and a portion of a branch.

9. The method of claim 7, wherein the selected portion comprises one or more nodes, the one or more nodes being a subset of the plurality of nodes on the node tree diagram; and the optimal view comprises a first optimal view for the branching point corresponding to the one or more nodes.

10. The method of claim 1, wherein node tree diagram comprises a first node tree diagram and the display data comprises a first set of display data and further comprising adjusting the node tree diagram, wherein adjusting the node tree diagram includes:
receiving a selection of a second root node, the second root node being a different than the first root node;
mapping the features of the anatomical structure to a second node tree diagram, the second node tree diagram representing the anatomical structure and having:

(i) a second plurality of nodes, each of the second plurality of nodes representing a branching point in the anatomical structure and the second plurality of nodes comprising:
the second root node representing a second root branching point in the anatomical structure, and
one or more additional nodes representing one or more additional branching points in the anatomical structure, and (ii) one or more branches, each of the one or more branches connecting two the second plurality of nodes, each of the one or more branches representing a pathway between two branching points in the anatomical structure, wherein the second plurality of nodes and the one or more branches are arranged with the second root node being located centrally and the additional nodes being positioned a distance from the second root node, the position of the additional nodes being based on:
a pathway distance between the additional branching point and the second root branching point, or
the Euclidian distance between the additional branching point and the second root branching point; and generating a second set of display data, the second set of display data representative of the second node tree diagram.

11. The method of claim 10, wherein the first node tree diagram comprises a first set of one or more regions, each of the one or more regions comprising a visible boundary encompassing a respective portion of the node tree diagram, each of the regions being representative of a defined portion of the anatomical structure, and the second node tree diagram comprises a second set of one or more regions, each of the one or more regions comprising a visible boundary encompassing a respective portion of the second node tree diagram, the second set of one or more regions being a subset of the first set of one or more regions.

12. A method for analyzing an anatomical structure of a patient, the method comprising:
receiving volumetric scan data representative of three-dimensional features of the anatomical structure, the features comprising branching points, pathways connecting the branching points, and three-dimensional location data of the branching points and the pathways;
mapping the features of the anatomical structure to a node tree diagram, the node tree diagram representing the anatomical structure and having:
a plurality of nodes, each of the plurality of nodes representing a branching point in the anatomical structure and the plurality of nodes comprising:
a first root node representing a root branching point in the anatomical structure, and
one or more additional nodes representing one or more additional branching points in the anatomical structure,
one or more branches, each of the one or more branches connecting two of the plurality of nodes, each of the one or more branches representing a pathway between two branching points in the anatomical structure, wherein the plurality of nodes and the one or more branches are arranged with the first root node being located centrally and the additional nodes being positioned a distance from the first root node, the position of the additional nodes being based on:
a pathway distance between the additional branching point and the root branching point, or the Euclidian distance between the additional branching point and the root branching point; and a series of concentric orbit rings surrounding the first root node, wherein the series of orbit rings represents one or more anatomical parameters within the anatomical structure and each of the additional nodes is located on one of the concentric orbit rings in the series of concentric orbit rings; and generating display data representative of the node tree diagram.

13. The method of claim 12, wherein the one or more anatomical parameters comprises at least one of: the pathway distance between the root branching point and the one or more additional branching points; the Euclidean distance between the root branching points and the one or more additional branching points; the diameter of pathways within the anatomical structure; and an amount of branching generations from the root branching point.

14. The method of claim 12, further comprising:
annotating the node tree diagram, wherein annotating the node tree diagram to represent one or more features of the anatomical structure; and
generating annotated display data, the annotated display data representative of the annotated node tree diagram.

15. The method of claim 5, wherein annotating the node tree diagram comprises:
adjusting at least one from the group consisting of: colors, shades, textures, text, and marks on a portion of the node tree diagram; or
adjusting at least one from the group consisting of: one or more of the plurality of nodes and one or more of the one or more branches.

16. The method of claim 12, further comprising:
providing the display data to a display; and
providing one or more images to the display, the one or more images representative of the anatomical structure.

17. The method of claim 16, further comprising:
receiving a selection on a portion of the node tree diagram; and
annotating the portion of the one or more images which is represented by the selected portion.

18. The method of claim 16, further comprising:
receiving a selection on a portion of the node tree diagram; and
adjusting at least of the one or more images to provide an optimal view for the selected portion.

19. The method of claim 18, wherein the selected portion comprises a point on the node tree diagram, and the point comprises at least one of: a node and a portion of a branch.

20. The method of claim 18, wherein the selected portion comprises one or more nodes, the one or more nodes being a subset of the plurality of nodes on the node tree diagram; and the optimal view comprises a first optimal view for the branching point corresponding to the one or more nodes.

21. The method of claim 12, wherein node tree diagram comprises a first node tree diagram and the display data comprises a first set of display data and further comprising adjusting the node tree diagram, wherein adjusting the node tree diagram includes:
receiving a selection of a second root node, the second root node being a different than the first root node;
mapping the features of the anatomical structure to a second node tree diagram, the second node tree diagram representing the anatomical structure and having:
(i) aa second plurality of nodes, each of the second plurality of nodes representing a branching point in the anatomical structure and the second plurality of nodes comprising:
the second root node representing a second root branching point in the anatomical structure, and
one or more additional nodes representing one or more additional branching points in the anatomical structure, and
(ii) one or more branches, each of the one or more branches connecting two the second plurality of nodes, each of the one or more branches representing a pathway between two branching points in the anatomical structure, wherein the second plurality of nodes and the one or more branches are arranged with the second root node being located centrally and the additional nodes being positioned a distance from the second root node, the position of the additional nodes being based on:
a pathway distance between the additional branching point and the second root branching point, or
the Euclidian distance between the additional branching point and the second root branching point; and
generating a second set of display data, the second set of display data representative of the second node tree diagram.

22. The method of claim 21, wherein the first node tree diagram comprises a first set of one or more regions, each of the one or more regions comprising a visible boundary encompassing a respective portion of the node tree diagram, each of the regions being representative of a defined portion of the anatomical structure, and the second node tree diagram comprises a second set of one or more regions, each of the one or more regions comprising a visible boundary encompassing a respective portion of the second node tree diagram, the second set of one or more regions being a subset of the first set of one or more regions.

* * * * *